US009693337B2

(12) United States Patent
Veerepalli et al.

(10) Patent No.: US 9,693,337 B2
(45) Date of Patent: Jun. 27, 2017

(54) METHOD OF ENHANCING USER EXPERIENCE BY USING SYSTEM INFORMATION IN LTE EMBMS

(71) Applicant: QUALCOMM Incorporated, San Diego, CA (US)

(72) Inventors: Sivaramakrishna Veerepalli, San Diego, CA (US); Jack Shyh-Hurng Shauh, San Diego, CA (US); Kuo-Chun Lee, San Diego, CA (US); Vaibhav Singhal, San Diego, CA (US); Utpal Barman, San Deigo, CA (US); Daniel Amerga, San Diego, CA (US); Muralidharan Murugan, San Diego, CA (US); Jun Wang, San Diego, CA (US); Ralph Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 14/475,212

(22) Filed: Sep. 2, 2014

(65) Prior Publication Data

US 2015/0063193 A1    Mar. 5, 2015

Related U.S. Application Data

(60) Provisional application No. 61/873,320, filed on Sep. 3, 2013.

(51) Int. Cl.
*H04W 72/00* (2009.01)
*H04L 12/18* (2006.01)
(Continued)

(52) U.S. Cl.
CPC ....... *H04W 72/005* (2013.01); *H04L 12/1845* (2013.01); *H04W 48/00* (2013.01);
(Continued)

(58) Field of Classification Search
None
See application file for complete search history.

(56) References Cited

U.S. PATENT DOCUMENTS

| 2008/0227453 | A1 | 9/2008 | Somasundaram et al. |
| 2013/0195003 | A1 | 8/2013 | Lee et al. |

(Continued)

FOREIGN PATENT DOCUMENTS

| CA | 2851341 A1 | 4/2013 |
| CN | 103581834 A | 2/2014 |

(Continued)

OTHER PUBLICATIONS

3GPP TS 36.331 V12.1.0 (Mar. 2014), 3rd Generation Partnership Project; Technical Specification Group Radio Access Network; Evolved Universal Terrestrial Radio Access (E-UTRA); Radio Resource Control (RRC); Protocol specification (Release 12); Retrieved from URL: http://www.3gpp.org/ftp/Specs/archive/36_series/36331/36331-c10.zip, Retrieved on: Mar. 13, 2014, 356 Pages.

(Continued)

*Primary Examiner* — Kodzovi Acolatse
(74) *Attorney, Agent, or Firm* — Arent Fox LLP

(57) ABSTRACT

A method, an apparatus, and a computer program product for wireless communication are provided. The apparatus receives a request to receive a Multimedia Broadcast Multicast Service (MBMS) service associated with a service area identity (SAI) and a second frequency. The apparatus performs inter-frequency cell reselection from a first cell transmitting at a first frequency to a second cell transmitting at the second frequency, the second cell being an inter-frequency neighbor cell to the first cell. The apparatus receives system information from the second cell. The apparatus determines that the second cell transmitting at the second frequency is unassociated with the SAI based on the
(Continued)

received system information. The apparatus blacklists the SAI on the second frequency in a blacklist for at least a period of time upon determining that the second cell is unassociated with the SAI.

27 Claims, 19 Drawing Sheets

(51) Int. Cl.
  *H04W 48/16*  (2009.01)
  *H04W 48/00*  (2009.01)
  *H04W 48/12*  (2009.01)
  *H04W 48/18*  (2009.01)

(52) U.S. Cl.
  CPC ............ *H04W 48/16* (2013.01); *H04W 48/12* (2013.01); *H04W 48/18* (2013.01)

(56) References Cited

U.S. PATENT DOCUMENTS

| | | | |
|---|---|---|---|
| 2013/0242738 A1 | 9/2013 | Chang | |
| 2014/0036755 A1 | 2/2014 | Lee et al. | |
| 2016/0135099 A1* | 5/2016 | Werner | H04W 4/06 370/329 |

FOREIGN PATENT DOCUMENTS

| | | |
|---|---|---|
| WO | 2013023558 A1 | 2/2013 |
| WO | 2014027837 A1 | 2/2014 |

OTHER PUBLICATIONS

Alcatel-Lucent et al., "Remaining Issues on Provisioning of MBMS SAIs in the RAN", 3GPP Draft, R2-121634, 3rd Generation Partnership Project (3GPP), Mobile Competence Centre, 650, Route Des Lucioles, F-06921 Sophia-Antipolis Cedex, France, vol. RAN WG2, no. Jeju, Korea, Mar. 26, 2012-Mar. 30, 2012, Mar. 19, 2012 (Mar. 19, 2012), XP050606092 [retrieved on Mar. 19, 2012].

Qualcomm Incorporated, "Assistance Information for MBMS UEs", 3GPP Draft, R2-121358, 3rd Generation Partnership Project (3GPP), Mobile Competence Centre, 650, Route Des Lucioles, F-06921 Sophia-Antipolis Cedex, France, vol. RAN WG2, no. Jeju, South Korea, Mar. 26, 2012-Mar. 30, 2012, Mar. 20, 2012 (Mar. 20, 2012), XP050606274, [retrieved on Mar. 20, 2012].

Qualcomm Incorporated et al., "Consideration of Service Continuity with eMBMS Support on NCT", 3GPP Draft, R2-131237_SERVECONTINUITYNCT, 3rd Generation Partnership Project (3GPP), Mobile Competence Centre, 650, Route Des Lucioles, F-06921 Sophia-Antipolis Cedex, France, vol. RAN WG2, no. Chicago, USA, Apr. 15, 2013-Apr. 19, 2013, Apr. 6, 2013 (Apr. 6, 2013), XP050699456, Retrieved from the Internet: URL: http: //www.3gpp.org/ftp/tsg_ran/WG2_RL2/TSGR2_81bis/Docs/> [retrieved on Apr. 6, 2013].

Alcatel-Lucent et al., "Remaining Issues on Provisioning of MBMS SAIs in the RAN", 3GPP Draft, R2-121634, 3rd Generation Partnership Project (3GPP), Mobile Competence Centre, 650, Route Des Lucioles, F-06921 Sophia-Antipolis Cedex, France, vol. RAN WG2, No. Jeju, Korea, 20120326-20120330, Mar. 19, 2012 (Mar. 19, 2012), XP050606092 [retrieved on Mar. 19, 2012].

International Search Report and Written Opinion—PCT/US2014/053821—ISA/EPO—Feb. 13, 2015.

Qualcomm Incorporated, "Assistance Information for MBMS UEs", 3GPP Draft, R2-121358, 3rd Generation Partnership Project (3GPP), Mobile Competence Centre, 650, Route Des Lucioles, F-06921 Sophia-Antipolis Cedex, France, vol. RAN WG2, No. Jeju, South Korea, 20120326-20120330, Mar. 20, 2012 (Mar. 20, 2012), XP050606274, [retrieved on Mar. 20, 2012].

Qualcomm Incorporated et al., "Consideration of Service Continuity with eMBMS Support on NCT", 3GPP Draft, R2-131237_SERVECONTINUITYNCT, 3rd Generation Partnership Project (3GPP), Mobile Competence Centre, 650, Route Des Lucioles, F-06921 Sophia-Antipolis Cedex, France, vol. RAN WG2, No. Chicago, USA, 20130415-20130419, Apr. 6, 2013 (Apr. 6, 2013), XP050699456, Retrieved from the Internet: URL: http://www.3gpp.org/ftp/tsg_ran/WG2_RL2/TSGR2_81bis/Docs/> [retrieved on Apr. 6, 2013].

\* cited by examiner

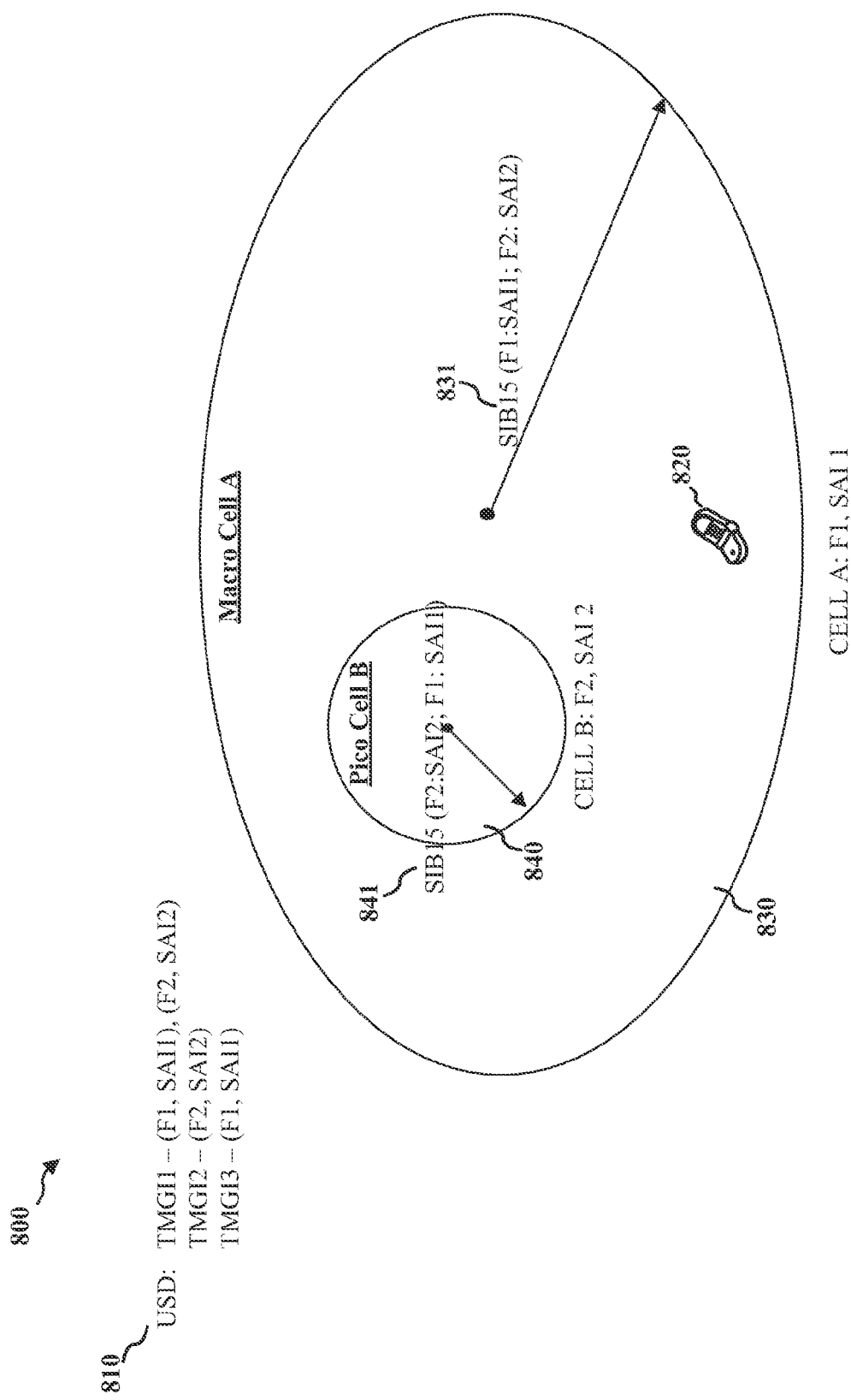

METHOD OF ENHANCING USER EXPERIENCE BY USING SYSTEM INFORMATION IN LTE EMBMS

CROSS-REFERENCE TO RELATED APPLICATION(S)

This application claims the benefit of U.S. Provisional Application Ser. No. 61/873,320, entitled "A METHOD OF ENHANCING USER EXPERIENCE BY USING SYSTEM INFORMATION IN LTE EMBMS" and filed on Sep. 3, 2013, which is expressly incorporated by reference herein in its entirety.

BACKGROUND

Field

The present disclosure relates generally to communication systems, and more particularly, to a user equipment receiving a multimedia broadcast multicast service.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may receive at a service layer a system information block type 15 (SIB15) indicating at least one service area identity (SAI) corresponding to at least one frequency. The apparatus may detect at the service layer a user service description (USD) indicating at least one evolved multimedia broadcast multicast service (eMBMS) service corresponding to at least one SAI and at least one frequency. The apparatus may correlate the USD with the SIB15 at the service layer and determine at least one available eMBMS service based on the correlation. The apparatus may determine at the service layer based on information received from a modem layer whether a serving cell is capable of providing an available eMBMS service at a serving frequency.

The apparatus may send from the service layer to the modem layer a request for an available eMBMS service in the serving cell at the serving frequency. The apparatus may determine at the modem layer that the serving cell transmitting at the serving frequency does not provide the eMBMS service. The apparatus may send from the modem layer to the service layer, based on the determination, an SAI list associated with the serving frequency, the SAI list including an indication that each SAI in the SAI list is not provided by the serving cell. The apparatus may determine at the service layer that the serving cell is not capable of providing the requested eMBMS service based on the SAI list. The apparatus may be configured to determine at the service layer that the serving cell is not capable of providing the requested eMBMS service based on the SAI list by determining that a Temporary Mobile Group Identity (TMGI) corresponding to an SAI in the SAI list is not provided by the serving cell.

The apparatus may send from the modem layer to the service layer an SAI list associated with the serving frequency. The apparatus may determine at the modem layer a TMGI list including one or more TMGIs provided by the serving cell associated with the serving frequency. The apparatus may send from the modem layer to the service layer the determined TMGI list. The apparatus may determine at the service layer whether the serving cell provides a requested eMBMS service based on the SAI list and the determined TMGI list. The service layer may determine that a TMGI included in the TMGI list is available from the serving cell, and the service layer may determine that a SAI included in the SAI list is available from the serving cell when the SAI corresponds to a TMGI included in the TMGI list. An activate service request is not sent from the service layer to the modem layer if the serving cell does not provide the requested eMBMS service.

The apparatus may a request to receive a Multimedia Broadcast Multicast Service (MBMS) service associated with a service area identity (SAI) and a second frequency. The apparatus may perform inter-frequency cell reselection from a first cell transmitting at a first frequency to a second cell transmitting at the second frequency, the second cell being an inter-frequency neighbor cell to the first cell. The apparatus may receive system information from the second cell. The apparatus may determine that the second cell transmitting at the second frequency is unassociated with the SAI based on the received system information. The apparatus may blacklist the SAI on the second frequency in a blacklist for at least a period of time upon determining that the second cell is unassociated with the SAI. The apparatus configured to determine that the second cell is unassociated with the SAI on the second frequency may be further configured to determine that an intra-frequency SAI list of the second cell does not include the SAI on the second frequency. The apparatus may start an activation timer before performing the inter-frequency cell reselection from the first cell to the second cell upon determining that the second frequency corresponding with the requested MBMS service is the same as the second frequency of the second cell, where after the second cell is reselected, the SAI on the second frequency is not blacklisted if the SAI is included in an intra-frequency SAI list of the second frequency of the second cell, and when the activation timer expires and the requested MBMS service is not provided in the second cell, activation failure is reported.

The apparatus may perform inter-frequency cell reselection from the second cell transmitting at the second frequency to the first cell transmitting at the first frequency based on a mobility of a user equipment (UE) and signal qualities of the first and second cells. The apparatus may report an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted. The apparatus may perform inter-frequency cell reselection from the first cell transmitting at the first frequency to a third cell transmitting at the second frequency based on a mobility of the UE and signal qualities of the first and the third cells, the third cell being an inter-frequency neighbor cell to the first cell. The apparatus may stop a blacklist timer and removing the SAI on the second frequency from the blacklist if system information of the third cell includes in an intra-frequency SAI list of the third cell the SAI on the second frequency. The apparatus may report the intra-frequency SAI list of the third cell associated with the second frequency without excluding the SAI on the second frequency and an inter-frequency SAI list of the third cell associated with each of the inter-frequency neighbors of the third cell.

The apparatus may start a blacklist timer when the SAI on the second frequency is blacklisted. When the blacklist timer expires, the apparatus may determine whether a current serving cell includes the SAI on the second frequency in system information of the current serving cell, and may report an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell. A duration of the blacklist timer is configured according to a mobility of a user equipment (UE) and the mobility of the UE is determined based on a travel history of the UE.

BRIEF DESCRIPTION OF THE DRAWINGS

FIG. 8 is an example diagram illustrating uses of the USD and the SIB.

DETAILED DESCRIPTION

Figure 1:
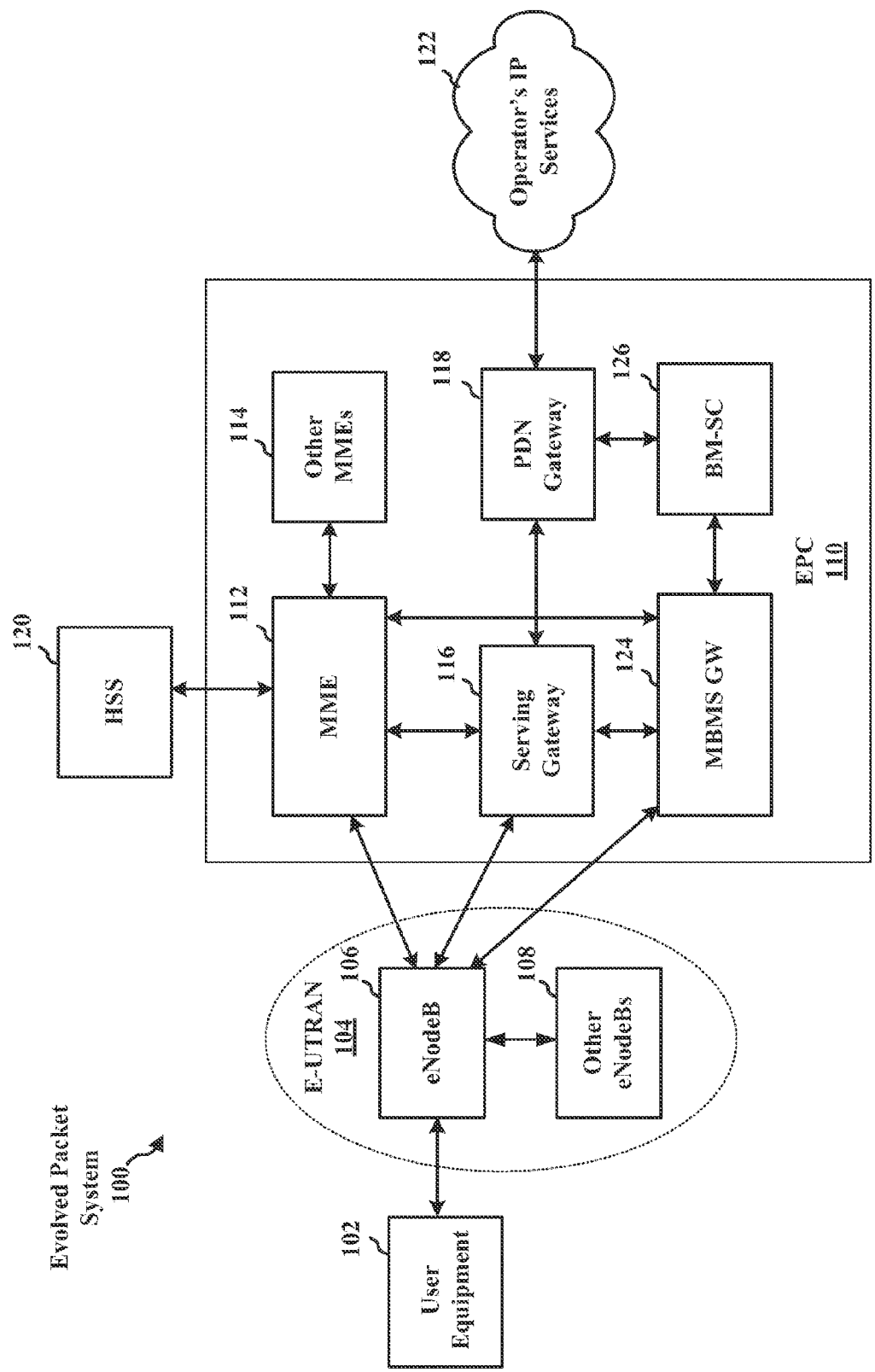
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
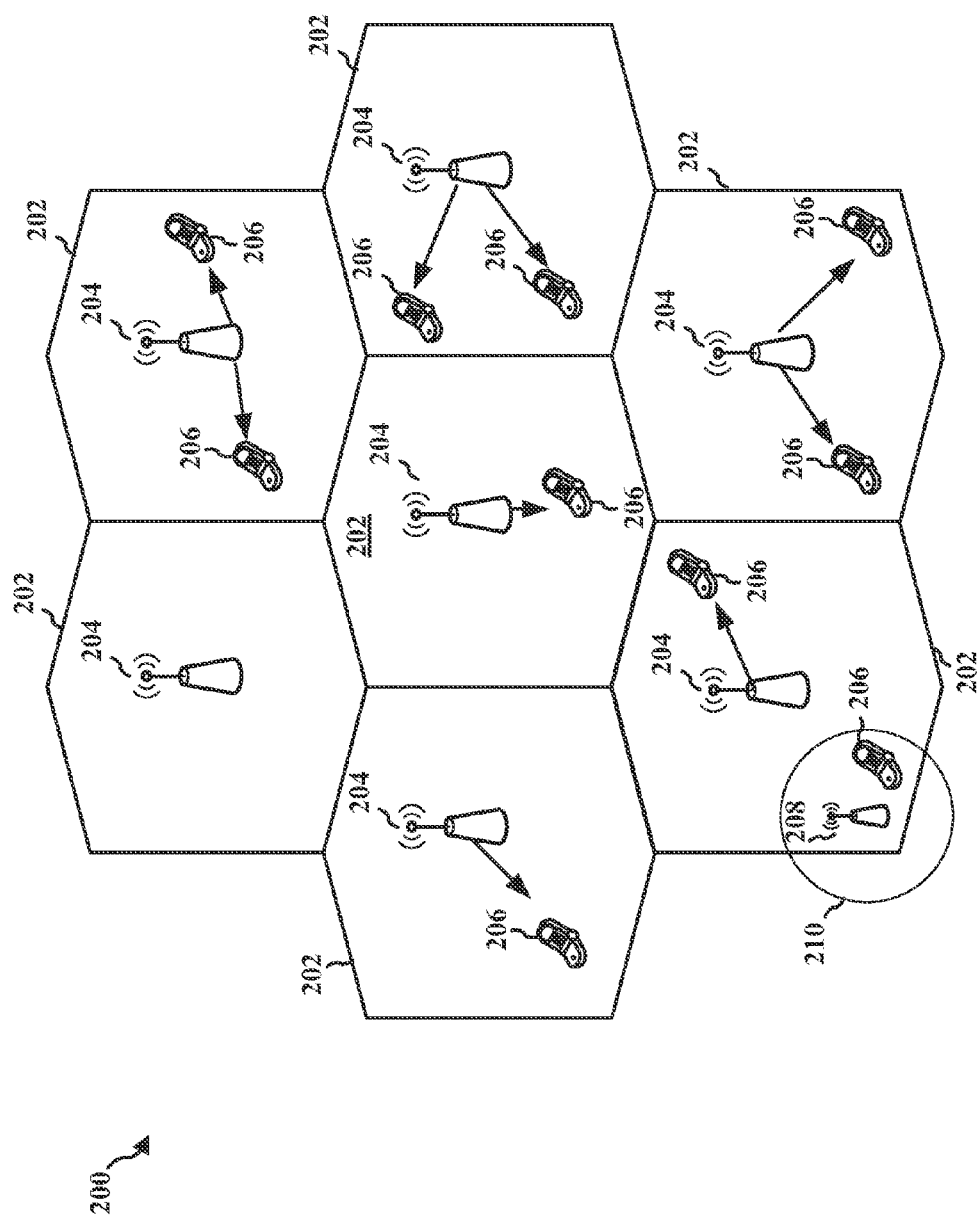
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi- MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
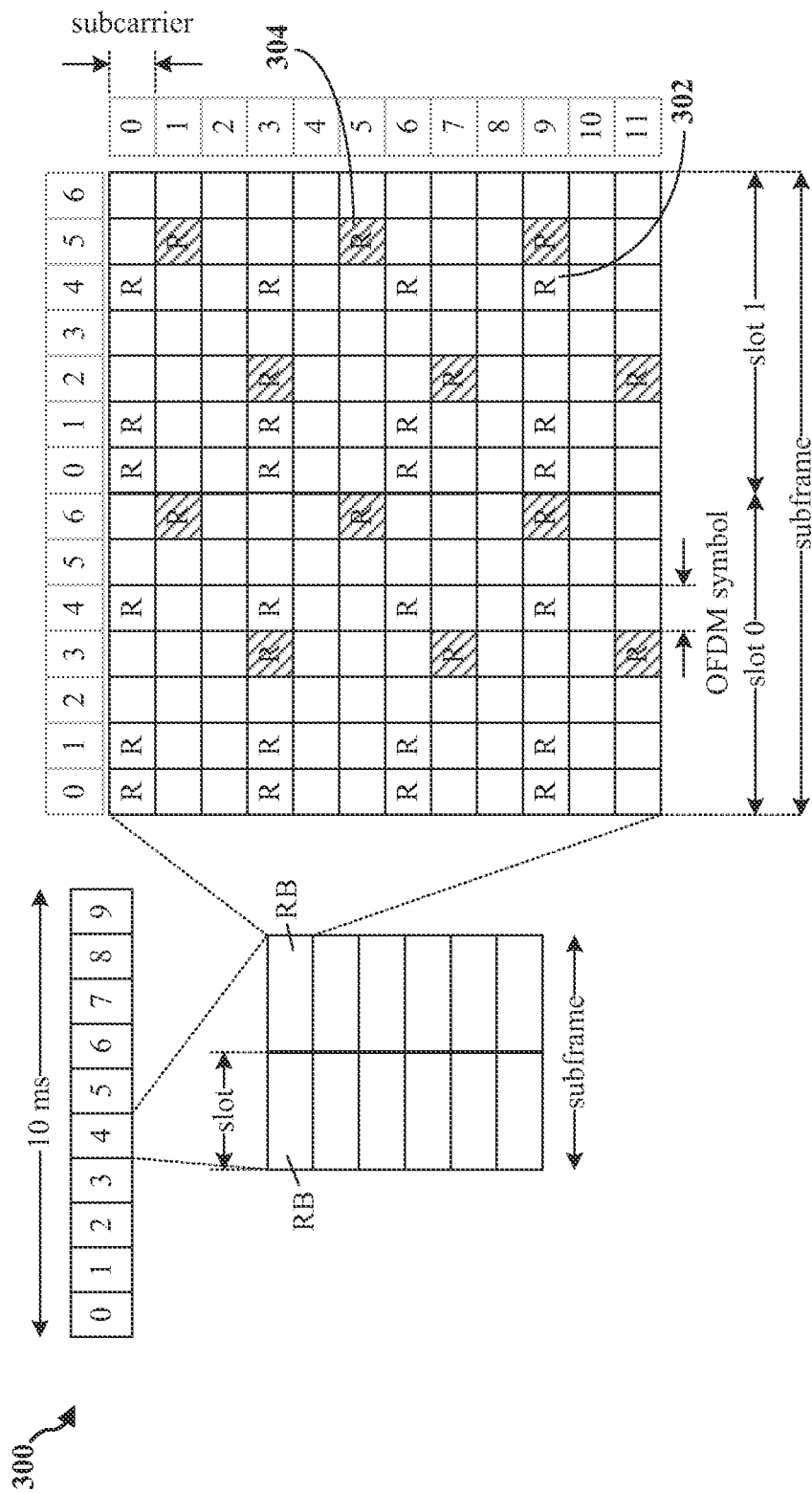
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
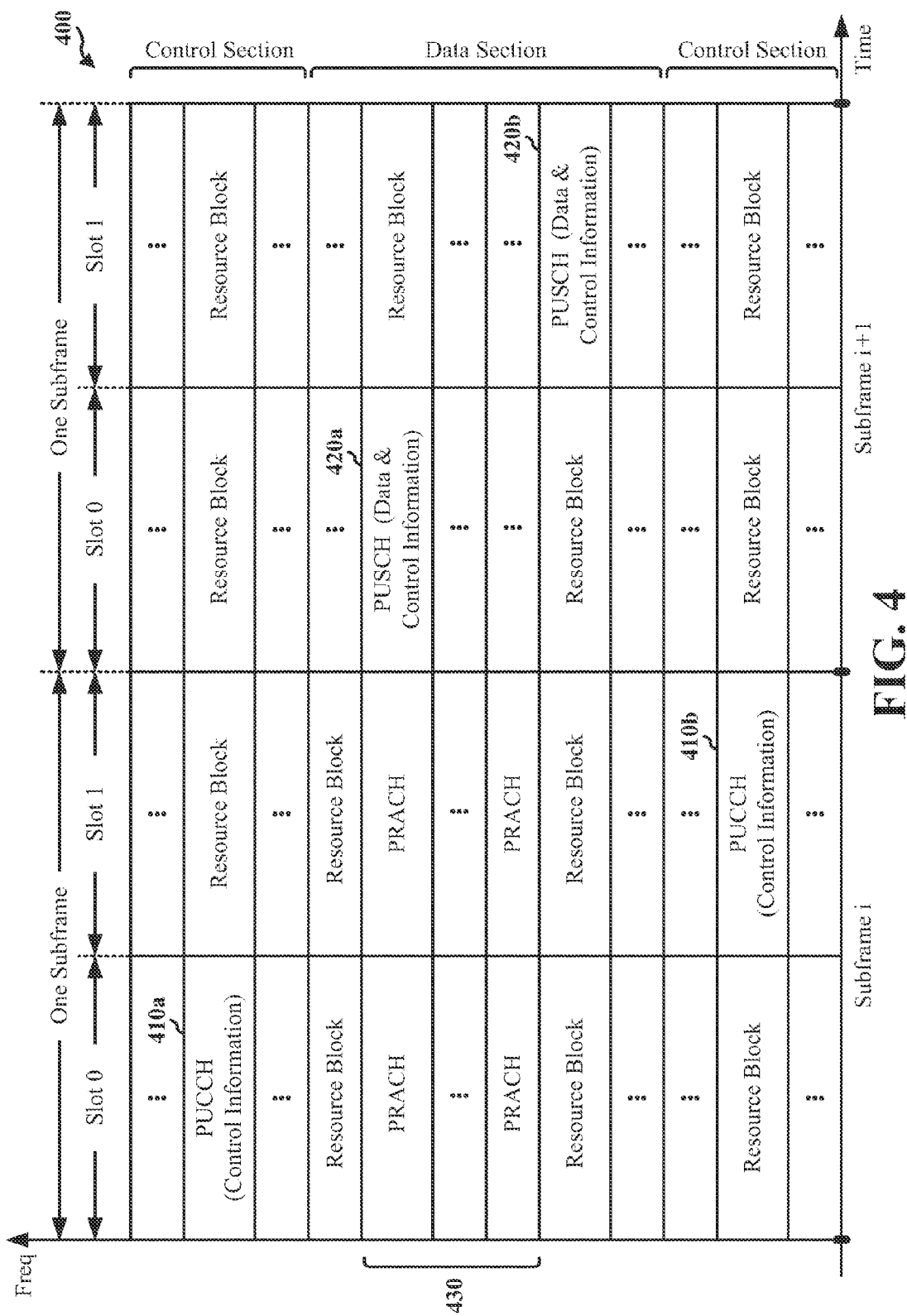
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
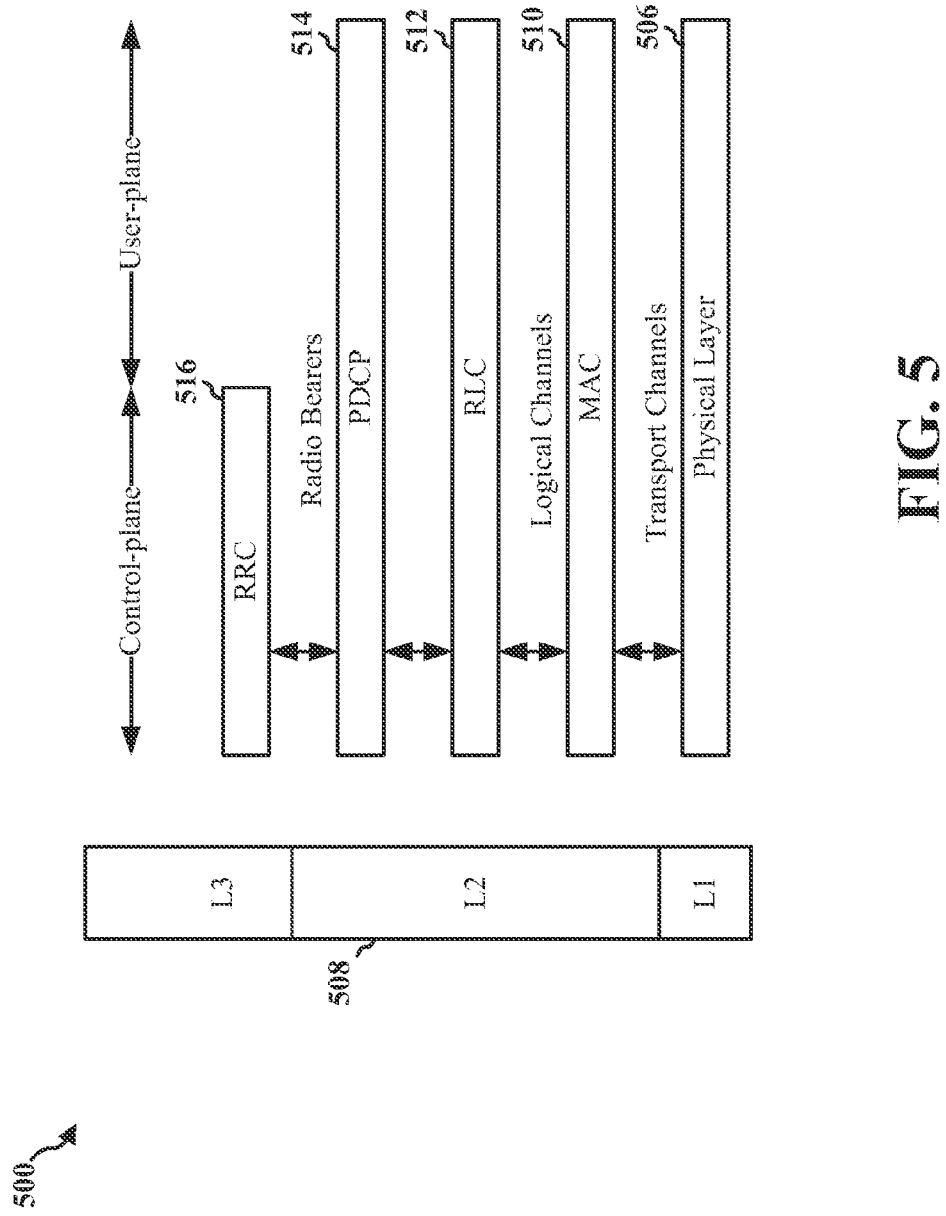
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
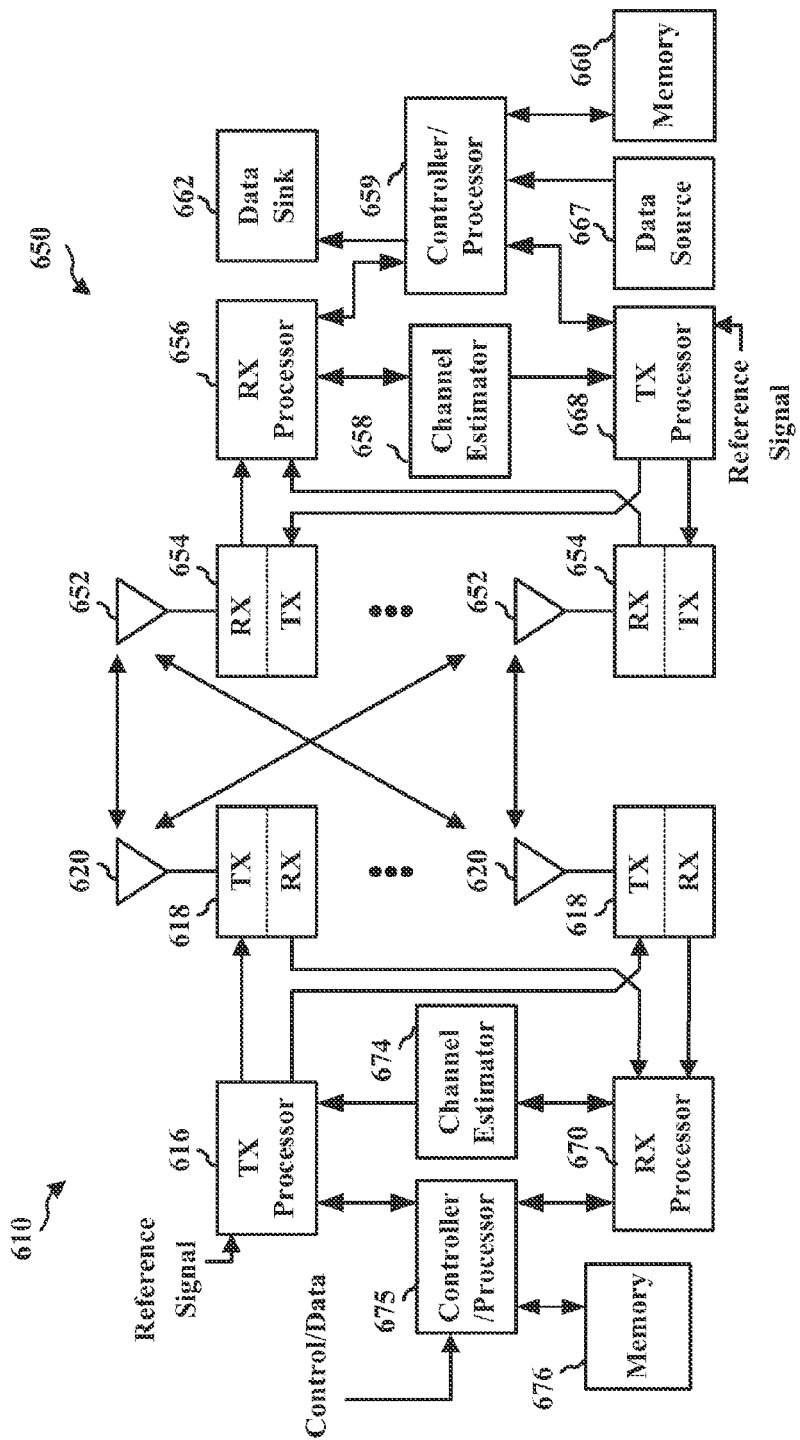
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
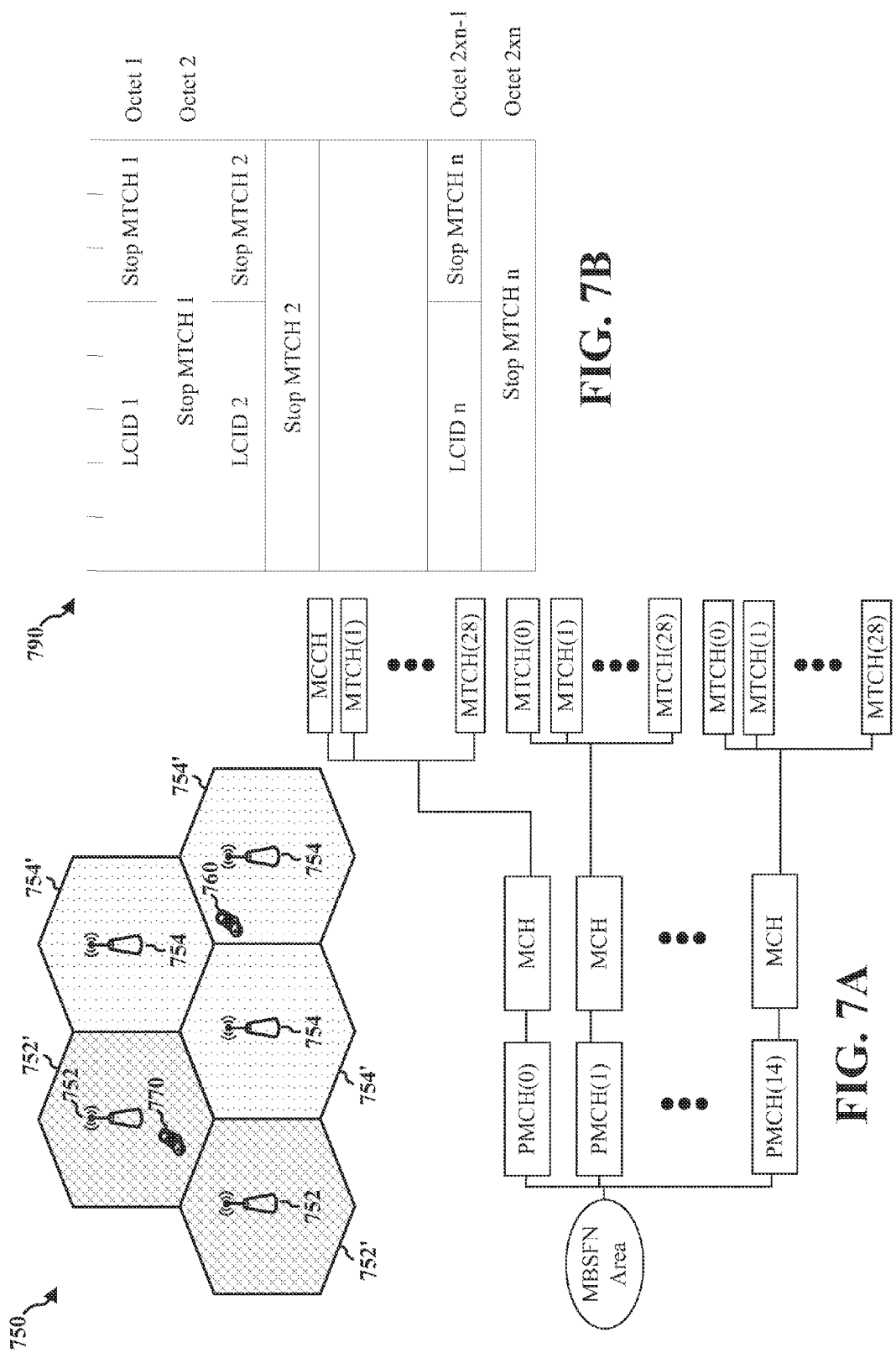
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The diagram 750 illustrates an MBMS service area, which is an area providing an eMBMS service. The MBMS service area may be divided into one or more MBSFN areas. Each MBSFN area is an area of eNBs which can synchronously transmit the same eMBMS contents. The MBSFN area can be used to broadcast venue, regional, and national contents. The size of an MBSFN area can be as small as one cell in case of in-venue broadcast. In the diagram 750, the eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There typically is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Mobility procedures for MBMS reception allow the UE to start or continue receiving MBMS service(s) via an MBSFN when the UE changes cell(s). E-UTRAN procedures provide support for service continuity with respect to mobility of the UE within the same MBSFN area. Within the same geographic area, MBMS services can be provided on more than one frequency. Frequencies that are used to provide MBMS services may change from one geographic area to another within a PLMN. UEs that are receiving MBMS service(s) in an RRC-idle state (RC_IDLE state) performing cell reselection or are in an RRC-connected state (RRC_CONNECTED state) obtain target cell MTCH information from the target cell MCCH.

To avoid a need to read MBMS-related system information and/or MCCH on neighbor frequencies of neighbor cells, the UE may be provided with a combination of MBMS assistance information such as a user service description (USD) and system information, such that the UE can be made aware of which frequency provides which MBMS services via the MBSFN. Generally, the BM-SC 126 of the EPC 110 provides the USD to the UE. In the USD (as described in 3GPP TS 26.346), for each service, the application/service layer provides the TMGI, a session start time, a session end time, frequencies and MBMS service area identities (MBMS SAIs, as described in section 15.3 of 3GPP TS 23.003) belonging to the MBMS service area. Each service is associated with a frequency for the service and an SAI that identifies a service area covered by a current cell for the service. For example, one SAI may be for a service area of the entire U.S. (a national coverage area) and another SAI may be for a service area of one city (a local coverage area). The USD indicates a frequency and a service area providing a particular service. The USD may include information for several services. When a user chooses a service via the UE, the UE selects the corresponding TMGI such that the service corresponding to the TMGI is provided. In addition, when the UE moves from one cell to another cell, local information carried in system information may be broadcast by each cell. As an example of the system information, the current serving cell, whether an MBMS cell or a non-MBMS cell, indicates in a system information block type15 (SIB15) the MBMS SAIs associated with the serving frequency of the serving cell and the MBMS SAIs of each neighbor inter-frequency, if any.

FIG. 8 is an example diagram 800 illustrating uses of the USD and the SIB. In particular, the diagram 800 is an example of how the USD and the SIB15 may be used to determine what service(s) or TMGI(s) are supported by a particular service area on a particular frequency. According to the example diagram 800, a USD 810 is provided to a UE 820 and includes TMGI1, TMGI2, and TMGI3. Generally, the UE 820 obtains the USD 810 from the network (e.g., EPC 110) when the UE 820 is turned on and becomes connected to the network, where the USD 810 is a global map in the network to indicate a service provide by a particular frequency in a particular service area (e.g., identified by an SAI). TMGI1 is available in Service Area Identity 1 (SAI1) on frequency 1 (F1) and in Service Area Identity 2 (SAI2) on frequency 2 (F2). TMGI2 is available in SAI2 on F2. TMGI3 is available in SAI1 on F1. Macro cell A 830 on the serving frequency F1 is associated with SAI1. Macro Cell A 830 broadcasts SIB15 831 which indicates the intra-frequency F1 with its associated Service Area Identity SAI1, and the neighbor inter-frequency F2 with its associated Service Area Identity SAI2. Thus, SIB15 831 includes (F1: SAI1; F2: SAI2). The neighbor inter-frequency F2 of Macro Cell A 830 is the serving frequency F2 of Pico Cell B 840 that is a neighbor of Macro Cell A 830. Pico Cell B 840 is on the serving frequency F2 and is associated with SAI2. Pico Cell B 840 broadcasts SIB15 841 which indicates the intra-frequency F2 with SAI2, and the neighbor inter-frequency F1 with SAI1. Thus, SIB15 841 includes (F2:SAI2; F1:SAI1). In the example diagram 800, the UE 820 is within the coverage of Macro Cell A 830. Hence, the UE 820 receives SIB15 831 from Macro Cell A 830. Based on the USD 810, the UE 820 determines that TMGI1 and TMGI3 are available in SAI1 on frequency F1. The UE 820 also determines based on the USD 810 that TMGI1 and TMGI2 are available in SAI2 on frequency F2.

SIB15 of a cell may include an intra-frequency SAI list associated with the current serving frequency or an intra-frequency followed by one or more inter-frequency SAI lists, where each inter-frequency SAI list is associated with one of the inter-frequencies. That is, SIB15 may include the intra-frequency of the current serving cell with one or more SAIs associated with the intra-frequency, followed by an inter-frequency of a neighbor cell with a list of SAIs associated with the inter-frequency. Thus, SIB15 may be expressed as SIB15 (intra-frequency SAI list, inter-frequency SAI list for neighbor inter-frequency 1, inter-frequency SAI list for neighbor inter-frequency 2, . . . ) or SIB15 (intra-frequency: SAI1, SAI2, . . . , neighbor inter-frequency 1:SAI1, SAI2, . . . , neighbor inter-frequency 2:SAI1, SAI2, neighbor inter-frequency n:SAI1, SAI2, . . . ). In the example illustrated in the diagram 800, the SIB15 831 transmitted by Cell A 830 includes an intra-frequency and associated SAI list of (F1:SAI1), and an inter-frequency F2 and associated SAI list of (F2:SAI2).

It is noted that the diagram 800 merely illustrates one example of Macro Cell A 830 having one inter-frequency neighbor cell (i.e., Pico Cell B 840). However, there may be more than one inter-frequency neighbor cell. For example, within Macro Cell A 830, there may be Pico Cell B 840 and another Pico Cell C. If Pico Cell C covers SAI3 with the serving frequency F3, then SIB15 transmitted by Macro Cell A 830 in this example would include (F1: SAI1; F2: SAI2; F3: SAI3), where F1 is the intra-frequency, and F2 and F3 are inter-frequencies.

In another case, a current cell on which the UE is camped and one or more neighbor cells of the current cell may transmit at the same frequency. In such a case, there is an intra-frequency but there may not be any neighbor inter-frequency. In this case, the SIB15 transmitted by a cell may include an intra-frequency SAI list, but may not include an inter-frequency SAI list. Thus, SIB15 may be expressed as SIB15 (intra-frequency SAI list) or SIB15 (intra-frequency: SAI1, SAI2, . . . ). It is noted that the intra-frequency SAI list may include one or more SAIs associated with the current cell on which the UE is camped as well as one or more SAIs associated with the one or more intra-frequency neighbor cells. For example, if a current cell and its neighbor cell transmit at frequency F1, and the current cell is associated with SAI1 and the neighbor cell is associated with SAI2, SIB15 transmitted by the current cell may be expressed as SIB15 (F1:SAI1 SAI2). Thus, in this example, SIB15 may include an intra-frequency F1 and associated SAI list of SAI1 associated with the current cell and SAI2 associated with the neighbor cell.

Figure 9A:
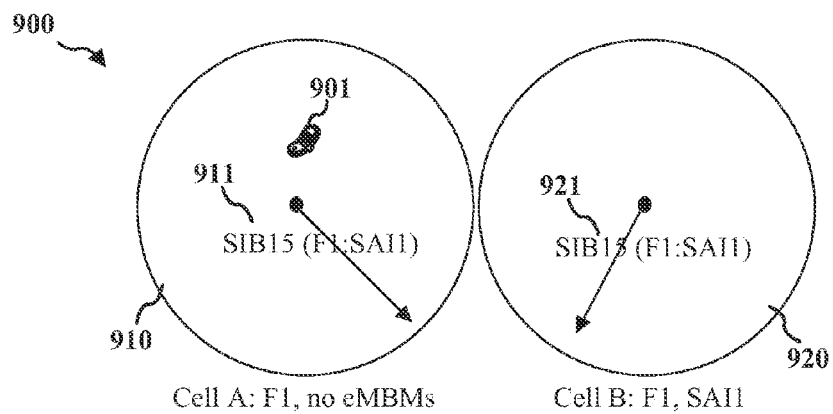
FIGS. 9A-9C illustrate example scenarios where problems may arise when procedures specified by existing standards are utilized.
Figure 9B:
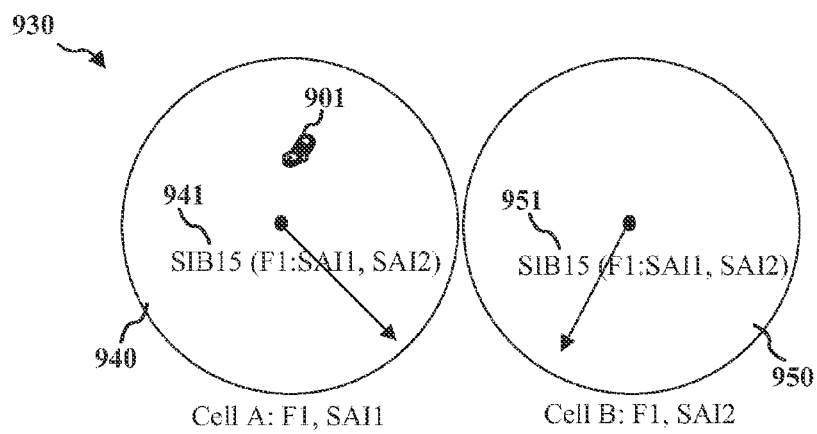
Figure 9C:
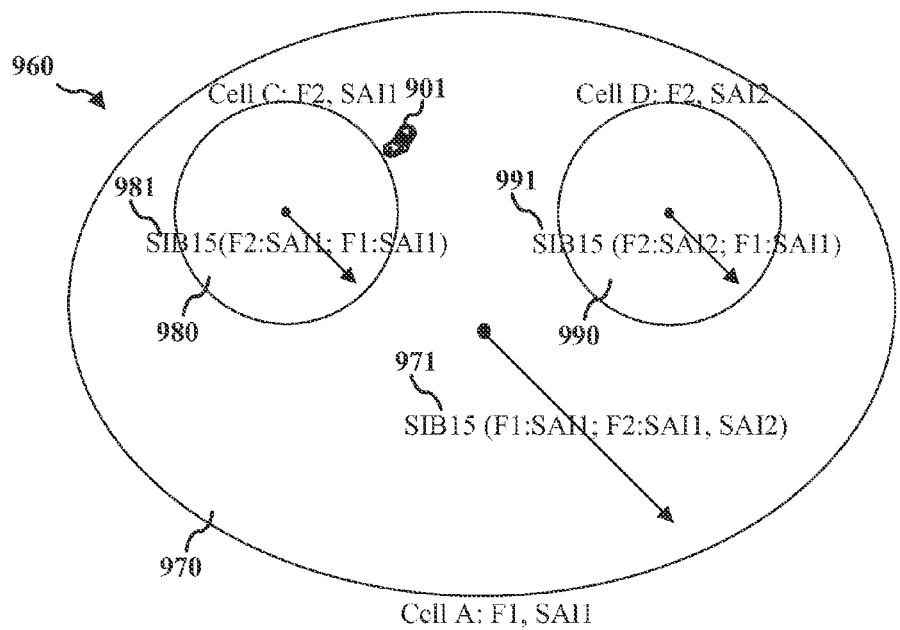

FIGS. 9A-9C illustrate example scenarios where problems may arise when current procedures specified by existing standards are utilized. In particular, the 3GPP standard is not clear as to what the SIB15 should contain with respect to intra-frequency neighbor configuration scenarios when there are multiple cells operating on a particular frequency that do not belong to the same SAI(s) or when at least one of the cells does not provide any eMBMS service. For example, the standard is not clear as to whether SIB15 should include only an SAI list of the serving cell or whether SIB15 should further include an SAI list of serving cell's intra-frequency neighbor cell(s).

FIG. 9A is an example diagram 900 illustrating a first scenario with an intra-frequency neighbor configuration. In this example, the UE 901 is positioned within Cell A 910. Cell A 910 and Cell B 920 are intra-frequency neighbors transmitting at the same serving frequency F1. In this example, Cell A 910 transmits at a serving frequency of F1, but does not provide any eMBMS service. Thus, Cell A 910 does not broadcast SIB13. Cell B 920 transmits at a serving frequency of F1 and is associated with service area identity SAI1, and broadcasts Cell B SIB15 921, which contains the information (F1:SAI1) for the intra-frequency F1 and associated SAI list indicating that F1 is an intra-frequency (i.e., the serving frequency) of Cell B 920. Although Cell A 910 does not provide any eMBMS service, Cell A 910 still broadcasts Cell A SIB15 911, which includes the information (F1:SAI1) for the intra-frequency F1 and associated SAI list, indicating that F1 is an intra-frequency of Cell A. Thus, Cell A 910 appears to the UE as if Cell A 910 provides an eMBMS service because Cell A 910 broadcasts Cell A SIB15 911 listing the serving frequency F1 and the Service Area Identity SAI1, which is caused by the presence of the neighbor Cell B 920 that is associated with SAI1 on frequency F1. For example, when the UE 901 camped on Cell A 910 selects a service corresponding to a TMGI that is available in SAI1, the TMGI activation will fail because Cell A 910 does not broadcast any eMBMS content. However, after the TMGI activation fails, the UE 901 may still show (for example, in a user interface) that SAI1 is available due to the presence of the neighbor Cell B 920. Then, the UE 901 camped on Cell A 910 may reattempt the TMGI activation and will again fail.

In particular, a modem layer (ML), which may be a bottom layer of the UE 901, receives and processes system information such as SIB15. Subsequently, the ML passes the SIB15 to the service layer (SL), which is an upper layer of the UE 901. The SL of the UE 901 receives the USD (as a global map of eMBMS services) when the UE 901 is activated. A user may use the UE 901 to select a particular service, which will trigger the SL to send a TMGI request corresponding to the selected service to the ML. The ML of the UE 901 camped on Cell A 910 will reject the TMGI request from the SL of the UE 901 when the ML of the UE 901 determines that Cell A 910 does not provide the eMBMS service. However, because Cell A SIB15 911 still contains F1 and SAI1 the SL may send the TMGI request to the ML again, and the ML will reject the TMGI request again because Cell A 910 does not provide the eMBMS service. Thus, the SL sending the TMGI request to the ML and the ML rejecting the TMGI request may become a continuous loop, which results in undesirable UE behavior.

FIG. 9B is an example diagram 930 illustrating a second scenario with another intra-frequency neighbor configuration. In this example, the UE 901 is positioned in Cell A 940.

Cell A 940 and Cell B 950 are intra-frequency neighbors located near each other. In the example of the diagram 930, both Cell A 940 and Cell B 950 provide eMBMS service. Cell A 940 transmits at a serving frequency of F1 and is associated with a service area identity SAI1. Cell A 940 broadcasts Cell A SIB15 941, with the following information (F1:SAI1, SAI2) which indicates that F1 is an intra-frequency of Cell A 940 and that F1 has an associated SAI list of SAI1 and SAI2. Cell B 950 transmits at a serving frequency of F1 and is associated with a service area identity SAI2. Cell B 950 broadcasts Cell B SIB15 951, with the following information (F1:SAI1, SAI2) which indicates that F1 is an intra-frequency of Cell B 950 and that F1 has an associated SAI list of SAI1 and SAI2. It is noted that the first frequency listed in the SIB15 from a cell is an intra-frequency of the cell. If the SIB15 lists more than one frequency, other frequencies than the first frequency are inter-frequencies due to the presence of neighbor cells operating at the other frequencies. For example, the UE 901 camped on Cell A 940 may select a service corresponding to a TMGI that is available in SAI2 because SAI2 associated with F1 is included in Cell A SIB15 941. Because Cell A 940 is only associated with SAI1 on F1, activation of the TMGI available in SAI2 at F1 will fail. However, after the TMGI activation fails, the UE 901 camped on Cell A 940 may still indicate (for example, in a user interface) that the service in SAI2 is available in Cell A 940 because Cell A SIB15 941 indicates that the service is available in both SAI1 and SAI2 on F1. Then, the UE 901 may retry activating the service by selecting again the service corresponding to a TMGI that is available in SAI2, and the TMGI activation will again fail.

In particular, the ML of the UE 901 receives and processes system information such as SIB15, and then passes the SIB15 information to the SL of the UE 901. Although Cell A supports SAI1 and does not support SAI2, the Cell A SIB15 941 indicates that both SAI1 and SAI2 are available on F1 because Cell A 940 supports SAI1 and the neighbor cell (i.e., Cell B 950) of Cell A 940 supports SAI2 on F1. Thus, if the UE 901 allows a user to choose a service whose TMGI corresponds to SAI2 associated with F1, the SL of the UE 901 will send the TMGI request for the TMGI corresponding to SAI2 associated with F1 to the ML of the UE 901. The ML will reject the TMGI request for SAI2 associated with F1 because the UE 901 in Cell A 941 is not associated with SAI2 available on frequency F1. However, because Cell A SIB15 941 has SAI2 associated with F1, the SL will send the TMGI request for the TMGI corresponding to SAI2 associated with F1 again, and the ML will reject the TMGI request again. Thus, the SL sending the TMGI request and the ML rejecting the TMGI request may become a continuous loop, which can be undesirable.

FIG. 9C is an example diagram 960 illustrating a third scenario with an inter-frequency neighbor configuration. Cell A 970 is a macro cell and Cell C 980 and Cell D 990 are pico cells within the coverage area of Cell A 970. Cell A 970 transmits at a serving frequency of F1 and is associated with a service area identity SAI1. Cell C 980 transmits at a serving frequency of F2 and is associated with a service area identity SAI1. Cell D 990 transmits at a serving frequency of F2 and is associated with a service area identity SAI2. In the example illustrated in the diagram 960, Cell A 970 and Cell C 980 are neighbors to each other and Cell A 970 and Cell D 990 are neighbors to each other. Cell C 980 and Cell D 990 are not neighbors to each other because Cell C 980 and Cell D 990 are not near each other and/or the signals of Cell C 980 and Cell D 990 are not strong enough to reach each other. However, it is noted that there may be another example not illustrated in FIG. 9C where two pico cells within a macro cell may be near each other and/or have signals strong enough to reach each other, and thus may be neighbors. Cell A 970 broadcasts Cell A SIB15 971, with following frequency/SAI information (F1:SAI1; F2:SAI1, SAI2). Hence, Cell A SIB15 971 has F1:SAI1 in the intra-frequency SAI list of Cell A SIB15 971 and F2:SAI1, SAI2 in the inter-frequency SAI list of Cell A SIB15 971. Thus, Cell A SIB15 971 includes SAI1 associated with F1 of Cell A 970 as well as SAI1 associated with F2 of the neighbor cell Cell C 980 and SAI2 associated with F2 of the neighbor cell Cell D 990. Cell C 980 broadcasts Cell C SIB15 981, with the following frequency/SAI information (F2:SAI1; F1:SAI1), and thus has F2:SAI1 in its intra-frequency SAI list and F1:SAI1 in its inter-frequency SAI list. Therefore, Cell C SIB 981 includes SAI1 associated with F2 of Cell C 980 as well as SAI1 associated with F1 of the neighbor cell Cell A 970. Cell D 990 broadcasts Cell D SIB15 991, with the following frequency/SAI information (F2:SAI2; F1:SAI1), and thus has F2:SAI2 in its intra-frequency SAI list and F1:SAI1 in its inter-frequency SAI list. Therefore, Cell D SIB15 991 includes SAI2 associated with F2 of Cell D 990 as well as SAI1 associated with F1 of the neighbor cell Cell A 970.

As illustrated in the diagram 960, the UE 901 is located within the coverage area of Cell A 970, near a border of Cell C 980. For example, the UE 901 may select a service corresponding to a TMGI associated with SAI2 on F2, where F2 is not the serving frequency of Cell A 970. Then, because Cell C 980 is close to the UE 901 and transmits at F2, the UE 901 reselects to Cell C 980 from Cell A 970 for the TMGI that is available in SAI2 on F2. However, because Cell C 980 is only associated with SAI1 on F2, the TMGI activation of the TMGI available in SAI2 on F2 fails. After the TMGI activation fails, the UE 901 may reselect Cell A 970 from Cell C 980 (e.g., due to the mobility of the UE 901), but the UE 901 may still show (for example, in a user interface) that both SAI1 and SAI2 are available on F2. The UE 901 may again select a service corresponding to the TMGI available in SAI2 on F2, which causes the UE 901 to reselect Cell C 980 from Cell A 970. Subsequently, the TMGI activation will fail again, which again causes the UE 901 to reselect Cell A 970 from Cell C 980. This creates an undesirable ping-pong effect of continuous reselection between Cell A 970 and Cell C 980, which may result in a negative user experience.

In particular, when the UE 901 camped on Cell A 970 is positioned near the border of Cell C 980, the ML of the UE 901 will report SIB15 received from Cell A 970 to the SL of the UE 901. Subsequently, the SL of the UE 901 will find all the TMGIs associated with all the services provided by F1: SAI1; F2: SAI1, SAI2 (e.g., TMGIs associated with the services provided in SAI1 on F1, SAI1 on F2, and SAI2 on F2). If the UE 901 chooses a service available on F2, the UE 901 reselects to Cell C 980 from Cell A 970 because Cell C 980 is near Cell A 970 and transmits at F2. The UE 901 may be in an RRC-idle state. After the UE 901 reselects Cell C 980, the UE 901 sets the reselection priority of F2 to be higher than the reselection priority of F1. However, if Cell C 980 does not provide the service selected by the UE 901, then the ML of the UE 901 will reject the TMGI request corresponding to the selected service. In this example, if the UE 901 selects a service corresponding to a TMGI available in SAI2 on F2, then the ML will reject a TMGI request for this service because Cell C 980 does not provide SAI2 on F2 and only Cell D 990 provides SAI2 on F2. In particular, the ML may determine that Cell C 980 does not provide the service corresponding to the TMGI available in SAI2 on F2 because the intra-frequency SAI list of Cell C SIB15 981 does not provide SAI2 on F2 and only provides SAI1 on F2. After the ML rejects the TMGI request for SAI2 with F2, the ML will set the reselection priority of F2 back to normal because the ML cannot find a service available in SAI2 on F2. Then, the UE 901 reselects Cell A 970 back from Cell C 980. If the UE 901 selects the service corresponding to the TMGI for SAI2 with F2 again, then the UE 901 again reselects Cell C 980 from Cell A 970 and sends the TMGI request to the ML, which subsequently rejects the TMGI request again. This process repeats and thus has the ping-pong effect of reselecting between the Cell A 970 and Cell C 980, unless the UE 901 moves away from Cell C 980 (e.g., by moving close to Cell D 990 that provides SAI2 on frequency F2). If the UE 901 moves close to Cell D 990, upon the TMGI request for SAI2 with F2, the UE 901 reselects Cell C 980 from Cell A 970 and the ML will accept the TMGI request for F2 and SAI2 because Cell D 990 provides SAI2 on F2. However, unless the UE 901 moves away from Cell C 980 and/or close to Cell D 990, the undesirable ping-pong effect may continue.

The continuous loop issue associated with the first scenario described in connection with the diagram 900 of FIG. 9A may be addressed as follows. In order to determine whether the serving cell on which the UE 901 is camped provides the eMBMS service of interest, the UE 901 detects whether the serving cell broadcasts SIB13. If the serving cell does not broadcast SIB13, the UE 901 determines that the serving cell does not provide any eMBMS service. If the ML of the UE 901 detects that the serving cell does not broadcast SIB13 and thus does not provide any eMBMS service, then the ML will report an intra-frequency SAI list to the SL of the UE 901 with a remark that the SAIs are not available in the current serving cell of the UE 901. When the SL recognizes the remark, the SL can determine that TMGIs corresponding to the SAIs in the intra-frequency SAI list are not available in the current serving cell. Thus, based on the remark, the SL determines that the current serving cell does not provide any eMBMS service. Referring to FIG. 9A, if the ML of the UE 901 detects that Cell A 910, the current serving cell of the UE 901, does not broadcast SIB13, then the ML will report the intra-frequency SAI list of Cell A 910 to the SL of the UE 901 with the remark that the SAIs in the intra-frequency SAI list are not available in Cell A 910. In this example, the intra-frequency SAI list of Cell A 910 has F1:SAI1, according to Cell A SIB15 911. When the SL of the UE 901 recognizes the remark, then the SL will determine that the Cell A 910 does not provide any eMBMS service. Then, the SL of the UE 901 will not consider a service associated with SAI1 on F1 as an available service in Cell A 910, although Cell A SIB15 911 includes F1:SAI1.

The continuous loop issue associated with the second scenario described in connection with the diagram 930 of FIG. 9B may be addressed as follows. As discussed above, if the serving cell provides an eMBMS service, the ML of the UE 901 sends the intra-frequency SAI list to the SL of the UE 901, without the remark that the SAIs are unavailable in the serving cell. In addition, the ML of the UE 901 may acquire SIB13 and MCCH transmitted by the serving cell in order to determine the available TMGIs indicated in the MBSFN Area Configuration message. Because SIB 13 includes the MCCH configuration, the UE 901 may acquire the MCCH based on the MCCH configuration. Based on the acquired the MCCH, the UE 901 may determine services that are offered by the current serving cell of the UE 901, and determine the available TMGIs that are offered by the current serving cell. Then, the ML of the UE 901 may provide the available TMGIs to the SL of the UE 901. In particular, the ML of the UE 901 may send a list of available TMGIs (e.g., AvailableTMGIList) to the SL of the UE 901. In summary, the SL of the UE 901 receives both the intra-frequency SAI list and the available TMGI list from the ML of the UE 901. The SL of the UE 901 can cross-check between the intra-frequency SAI list and the available TMGI list to determine the available TMGIs offered by the current serving cell. That is, the SL may determine which TMGIs are offered by the serving cell based on the intra-frequency SAI list, and may also determine which SAIs the serving cell is associated with on the serving frequency (e.g., intra-frequency) based on the available TMGI list. Thus, if a service selected by the UE 901 corresponds with the offered TMGI associated with the offered SAI on the serving frequency, then the UE determines that the serving cell provides the selected service. If a TMGI corresponding to a certain SAI associated with the serving frequency for the selected service is not found to be an available TMGI for the serving cell, the SL of the UE 901 determines that the serving cell does not provide the selected service, and thus does not send the TMGI request for the unavailable TMGI. The advantage of this approach is that there is no concern about the service layer falsely indicating that a service is available.

Referring to FIG. 9B, the ML of the UE 901 may send the intra-frequency SAI list and the available TMGI list to the SL of the UE 901. According to SIB13 and MCCH for Cell A 940, there is no available TMGI corresponding to F1 and SAI2 in Cell A 940. Thus, the available TMGI list sent to the SL of the UE 901 has a TMGI associated with SAI1 at F1, but does not have any TMGI associated with SAI2 at F1. The available TMGI list may include a list of one or more TMGIs that are available in a particular SAI on a particular serving frequency in the current serving cell. For example, TMGI1, TMGI2, and TMGI3 may be available TMGIs in SAI1 on F1, and TMGI1, TMGI4, and TMGI5 may be available TMGIs in SAI2 on F1. When the ML reports to the ML an intra-frequency SAI list (F1: SAI1 SAI2) of Cell A 940 and an available TMGI list (TMGI1, TMGI2, TMGI3) associated with SAI1 on F1 of the serving cell Cell A 940, the SL cross-checks between the intra-frequency SAI list and the available TMGI list. Based on the cross-checking, the SL determines that the available TMGIs are associated with SAI1 on F1. Thus, the SL determines that services associated with SAI2 are not provided by the serving cell Cell A 940, and that SAI2 is provided by one of Cell A's intra-frequency neighbor(s). Further, the SL of the UE 901 receives the intra-frequency SAI list of Cell A 940 from the ML. In this example, the intra-frequency SAI list of Cell A 910 has F1:SAI1 SAI2, according to Cell A SIB15 941. In this example, when the SL cross-checks the available TMGI list and the intra-frequency SAI list, the SL of the UE 901 determines that there is no service corresponding to SAI2 associated with F1 because the available TMGI list does not have the TMGIs corresponding to SAI2 associated with F1 (TMGI1, TMGI4, and TMGI5). Then, the UE 901 does not send a TMGI request for the unavailable TMGI.

The ping-pong effect associated with the third scenario described in connection with the diagram 960 of FIG. 9C may be addressed as follows. As discussed infra, referring to FIG. 9C, if the UE 901 is located within the coverage of a macro cell, Cell A 970, close to a border of a pico cell, Cell C 980, and selects a TMGI available in SAI2 on F2, the UE 901 reselects Cell C 980 from Cell A 970 because Cell C 980 is a neighbor of the UE 901 and F2 and SAI2 are included in Cell C SIB15 981. If the UE 901 does not discover the interested SAI2 associated with F2 (i.e., F2:SAI2), the ML of the UE 901 places SAI2 associated with F2 in a blacklist, and the ML of the UE 901 starts a blacklist timer for F2:SAI2. Then, a cell reselection is performed to reselect to Cell A 970 back from Cell C 980, depending on the UE mobility of the UE 901 and signal quality of Cell A 970 and Cell C 980, for example. F2:SAI2 is placed in the black list until the blacklist timer expires. While F2:SAI2 is on the black list, when the cell reselection is performed from Cell C 980 to Cell A 970, the ML sends an intra-frequency SAI list of Cell A 970 and an inter-frequency SAI list of Cell A 970 to the SL which excludes F2:SAI2 from the inter-frequency SAI list of Cell A 970 because F2:SAI2 is on the black list. Because F2:SAI2 is excluded from the inter-frequency SAI list of Cell A 970, the ML does not report F2:SAI2 to the SL even when F2:SAI2 is found in Cell A SIB15 971. Consequently, the UE 901 does not present (e.g., via a user interface) any service corresponding to F2:SAI2 as an available service, and thus the UE 901 will not choose such service corresponding to F2:SAI2. When the blacklist timer expires, UE 901 checks to ensure F2: SAI2 is in a SIB15 of the cell on which the UE 901 is currently camped. If so, the UE 901 will report an updated inter-frequency SAI list without excluding SAI2 associated with F2 if SAI2 is available on F2 according to the currently camped cell's SIB15 (i.e., F2:SAI2 is in the intra-frequency SAI list of the currently camped cell).

Prior to expiration of the blacklist timer, if the UE 901 camps on a cell transmitting at F2 and discovers that SIB15 of its currently camped cell has SAI2 in its intra-frequency SAI list, then the UE 901 will stop the blacklist timer and report again the updated SAI list with F2:SAI2. For example, the UE 901 may move closer to a border of Cell D 990 such that the UE 901 finds the signal strength of Cell C 1120 to be weak and the signal strength of Cell D 990 to be strong. In this example, cell reselection is performed to reselect from Cell A 970 to Cell D 990 because Cell D 990 is a neighbor of the UE 901 and F2:SAI2 is included in Cell D SIB15 991. Cell D SIB15 991 indicates that the intra-frequency SAI list of Cell D 990 has F2:SAI2. Therefore, the UE 901 stops the blacklist timer and removes F2:SAI2 from the black list. Then, the ML sends an intra-frequency SAI list of Cell D 990 and an inter-frequency SAI list of Cell D 990 to the SL without excluding F2:SAI2 from the intra-frequency SAI list of Cell D 990.

The duration of the blacklist timer (e.g., a time duration to be elapsed before the blacklist timer expires) may depend on the mobility of the UE 901 or how fast the UE 901 moves. The higher the mobility of the UE 901 is, the shorter the duration of the timer is, and the lower the mobility of the UE 901 is, the longer the duration of the timer is. The mobility may be determined based on the physical cell ID that the UE 901 receives when the UE enters a cell. Based on the physical cell ID, the locations of the cells may be determined and thus locations where the UE 901 has been may be determined. Frequent changes in the physical cell ID received by the UE 901 indicates high mobility. Further, the mobility of the UE 901 may be determined based on the GPS and/or the history of the UE's movement. The duration of the black list timer can be 5-10 minutes, for example.

Figure 10:
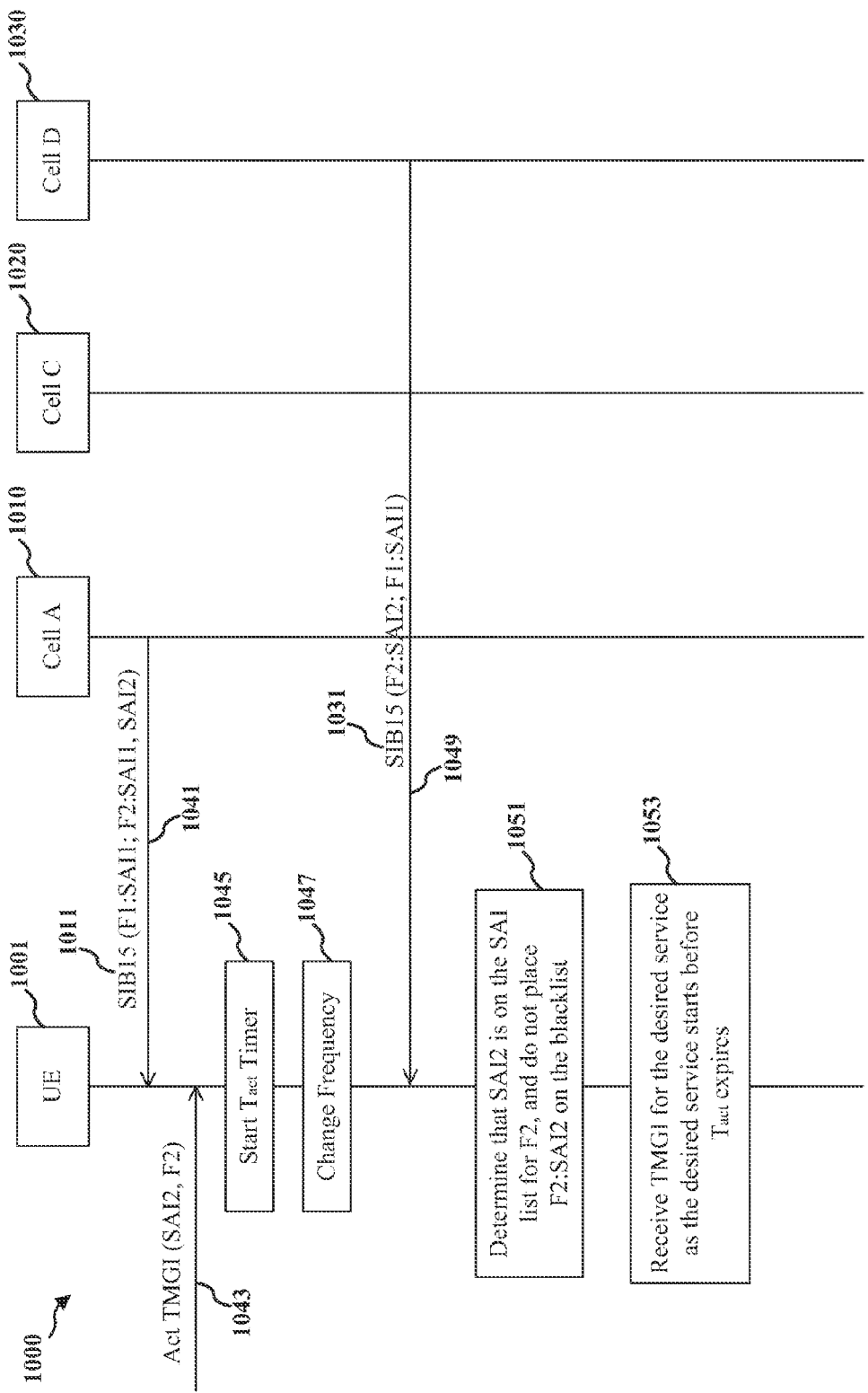
FIG. 10 illustrates an example flow diagram illustrating use of an activation time.

FIG. 10 illustrates an example flow diagram 1000 illustrating use of an activation time, $T_{act}$. The flow diagram 1000 includes the UE 1001, a macro cell Cell A 1010, Cell C 1020 and Cell D 1030, where Cell C 1020 and Cell D 1030 are pico cells located in Cell A 1010. Cell A 1010, Cell C 1020, and Cell D 1030 may respectively correspond to Cell A 970, Cell C 980, and Cell D 990 of FIG. 9C. Cell A 1010 transmits at a serving frequency of F1 and is associated with a service area identity of SAI1, and transmits Cell A SIB15 1011 of (F1:SAI1; F2:SAI1, SAI2). Cell D 1030 transmits at a serving frequency of F2 and is associated with a service area identity of SAI2, and transmits Cell D SIB15 1031 of (F2:SAI2; F1:SAI1).

When the UE 901 selects a service, the SL of the UE 901 generally sends a TMGI activation request for the TMGI corresponding to the selected service to the ML of the UE 901 a short time prior to the service start time of the service broadcast. The USD has a service available start time that indicates the time when the service starts. Because the service may be selected a short time prior to when the service is broadcast, it is not desirable to immediately place the selected TMGI in a blacklist when ML cannot find the TMGI on the MCCH. Thus, according to one example, as SAI2 is in the intra-frequency SAI list, the ML does not immediately place F2:SAI2 in the blacklist even when ML cannot find the desired TMGI on the MCCH. Instead, the ML starts an activation timer ($T_{act}$) after the TMGI Activation Request is received. The ML will report activation failure when $T_{act}$ expires and the TMGI does not show up on the MCCH. $T_{act}$ may be set to a duration of a few minutes. $T_{act}$ may be set to approximately 5 minutes, for example.

Referring to FIG. 10, in step 1041, Cell A 1010 broadcasts the Cell A SIB15 1011 to the UE 1001. In step 1043, when the UE 101 selects a service corresponding to F2:SAI2, the SL of the UE 1001 sends a TMGI request corresponding to F2:SAI2 to the ML of the UE 1001. In step 1045, the UE 1001 starts a $T_{act}$ timer. In step 1047, because Cell A 1010 does not provide F2 of the selected service, if the UE 1001 is close to a border of Cell D 1030, the UE 1001 performs a cell reselection procedure to reselect Cell D 1030 from Cell A 1010, thereby changing the serving frequency for the UE 1001 from F1 to F2. It is noted that the cell reselection process takes some time, and $T_{act}$ provides time to cover the time it takes for the cell reselection, to avoid immediately placing F2:SAI2 in the blacklist. In step 1049, the UE 1001 receives the Cell D SIB15 1031 from Cell D 1030. In step 1051, the UE 1001 determines that SAI2 on F2 is on the intra-frequency SAI list for F2 because Cell D 1030 supports a service associated with F2:SAI2. Thus, as long as $T_{act}$ has not expired, the UE 1001 does not place F2:SAI2 in the blacklist even if the service corresponding to the desired TMGI has not started (e.g., the UE 1001 has not received the desired TMGI). In this example, because SAI2 on F2 is in the intra-frequency SAI list, the UE 1001 does not blacklist SAI2 on F2, at least until $T_{act}$ expires. In step 1053, the UE 1001 receives the TMGI associated with the desired service (e.g., TMGI corresponding with F2:SAI2) if the UE can start the desired service before $T_{act}$ expires. However, in another example, if SAI2 is not on the intra-frequency SAI list for F2 (e.g., if the UE 1001 is camped on Cell C 980 and thus only SAI1 is in intra-frequency SAI list for F2) after $T_{act}$ expires, then the UE 1001 may reject activating the desired service.

Figure 11:
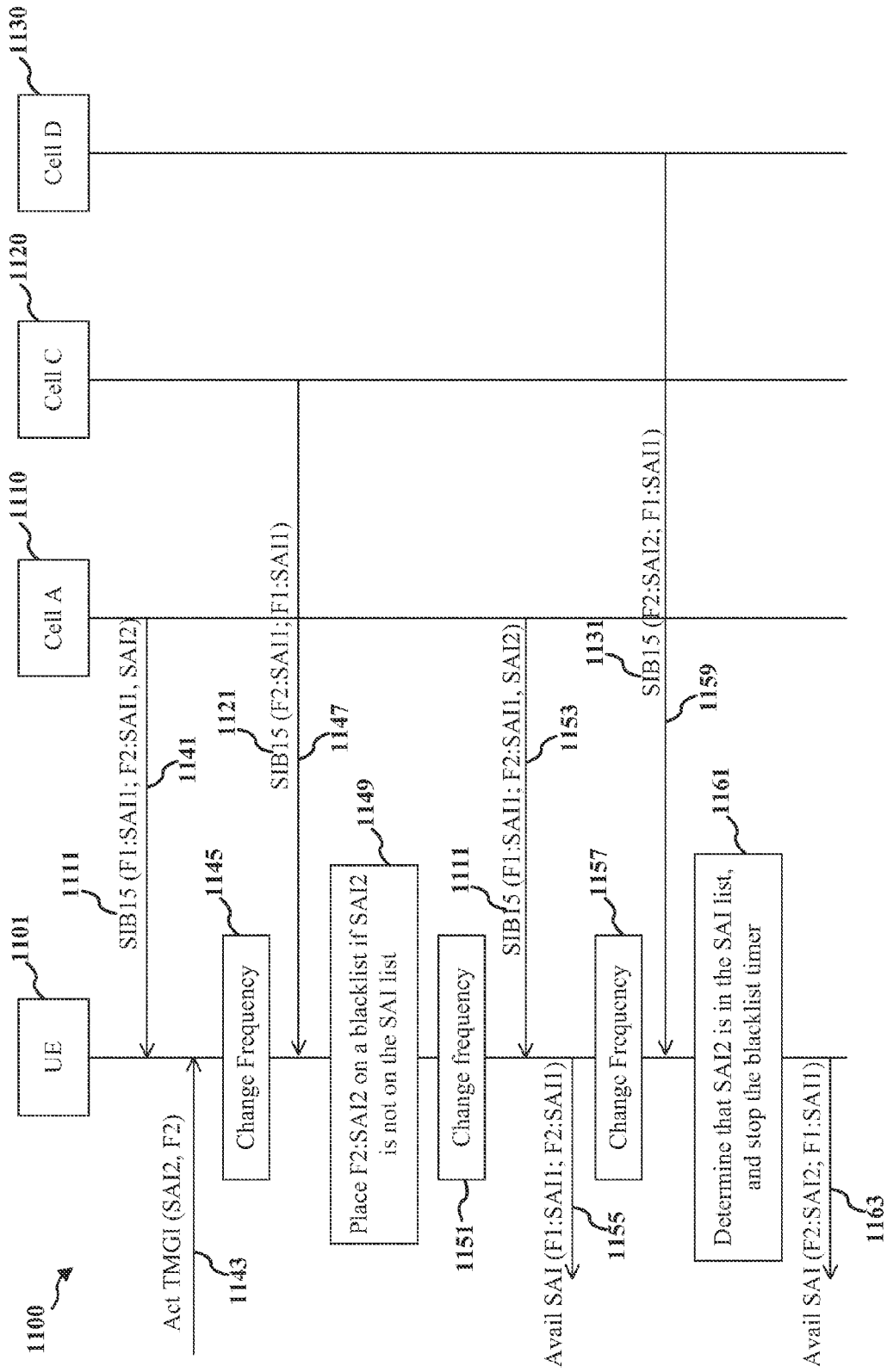
FIG. 11 illustrates an example flow diagram illustrating use of a blacklist.

FIG. 11 illustrates an example flow diagram 1100 illustrating use of the blacklist in the third scenario. The flow diagram 1100 includes the UE 1101, a macro cell Cell A 1110, and Cell C 1120 and Cell D 1130, where Cell C 1120 and Cell D 1130 are pico cells located in Cell A 1110. Cell A 1110, Cell C 1120, and Cell D 1130 may respectively correspond to Cell A 970, Cell C 980, and Cell D 990 of FIG. 9C. Cell A 1110 transmits at a serving frequency of F1 and is associated with a service area identity SAI1, and transmits Cell A SIB15 1111 including (F1:SAI1; F2:SAI1, SAI2).

Cell C 1120 transmits at a serving frequency of F2 and is associated with a service area identity SAI1, and transmits Cell C SIB15 1121 including (F2:SAI1; F1:SAI1). Cell D 1130 transmits at a serving frequency of F2 and is associated with (or is a member of) a service area identity SAI2, and transmits Cell D SIB15 1131 including (F2:SAI2; F1:SAI1). In step 1141, the UE 1101 receives Cell A SIB15 1111 from Cell A 1110. In step 1143, the UE 1101 chooses a service corresponding to F2:SAI2 (e.g., the service available in SAI2 on F2). In particular, the SL of the UE 1101 may send a TMGI request corresponding to F2:SAI2 (e.g., a TMGI request for TMGI1 available in SAI2 on F2) to the ML of the UE 1101, and then the ML may set a priority of F2 higher than F1. In step 1145, the UE 1101 performs a cell reselection procedure to reselect Cell C 1120 from Cell A 1110, thereby changing the serving frequency for the UE 1101 from F1 of Cell A 1110 to F2 of Cell C 1120. The UE 1101 may be in an RRC-idle state. In step 1147, after the reselection to Cell C 1120, the UE 1101 receives the Cell C SIB15 1121 from Cell C 1120. In step 1149, the UE 1101 checks whether SAI2 is on the intra-frequency list for F2. Because SAI2 is not on the intra-frequency list for F2, the UE 1101 places F2:SAI2 in a blacklist and starts a black list timer, in step 1149. In step 1151, the UE 101 lowers the priority of F2 to normal because the UE 1101 cannot receive a service corresponding to a TMGI associated with F2:SAI2, and then the UE 1101 performs a reselection procedure to reselect Cell A 1110 from Cell C 1120. In step 1153, after the UE 1101 reselects Cell A 1110, the UE 1101 receives Cell A SIB15 1111 from Cell A 1110. In step 1155, the UE 1101 reports an inter-frequency SAI list that excludes F2:SAI2 to the SL of the UE 1101 because F2:SAI2 is in the blacklist.

In step 1157, the UE 1101 in Cell A 1110 moves away from Cell C 1120 and toward Cell D 1130, such that the UE 1101 finds the signal strength of Cell C 1120 to be weak and the signal strength of Cell D 1130 to be strong. Because Cell D 1130 provides the serving frequency of F2, the UE 1101 performs a reselection procedure to reselect to Cell D 1130 from Cell A 1110, thereby changing the serving frequency for the UE 1101 from F1 to F2, according to step 1157. In step 1159, after reselecting to Cell D 1130, the UE 1101 receives Cell D SIB15 1131 from Cell D 1130. In step 1161, the UE 1101 determines that SAI2 is on the intra-frequency SAI list for F2 because Cell D 1130 supports a service corresponding F2:SAI2. In this case, if the blacklist timer for F2:SAI2 is still running, the UE 1101 stops the blacklist timer in step 1161. In step 1163, the UE 1101 reports the intra-frequency SAI list including SAI2 for F2 to the SL, and then the SL can find a service corresponding to a TMGI associated with F2:SAI2.

Figure 12:
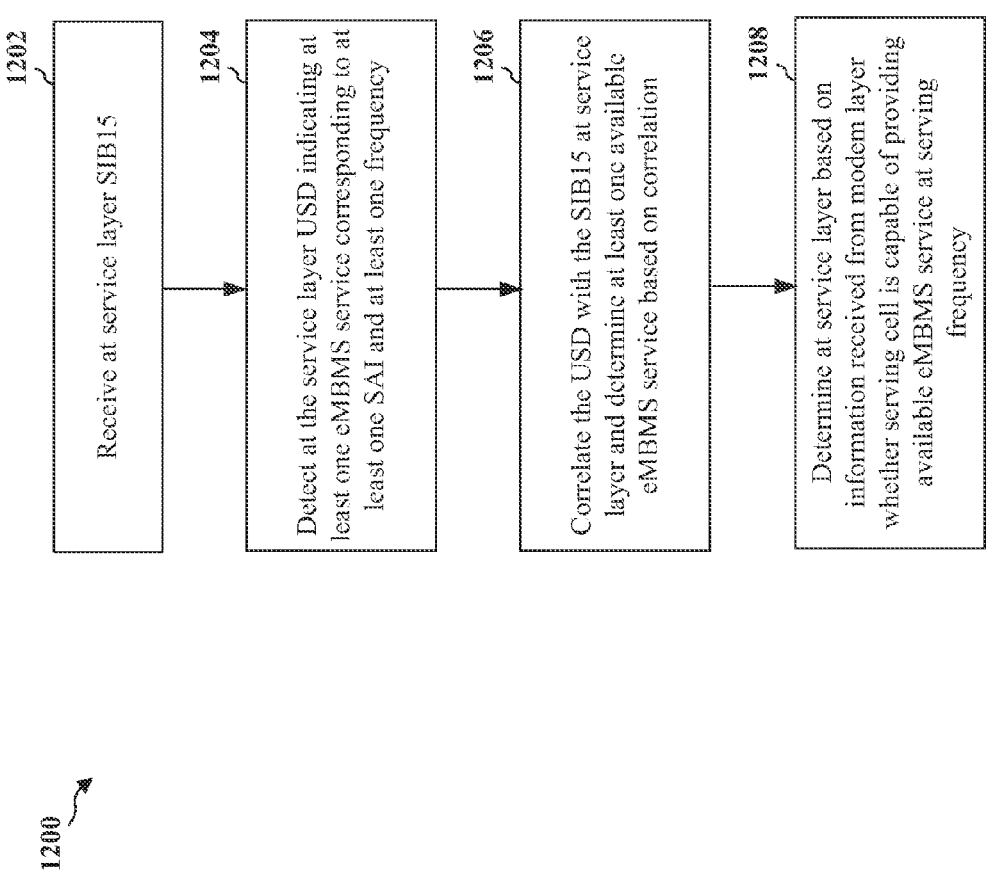
FIG. 12 is a flow chart of a method of wireless communication, according to one aspect.

FIG. 12 is a flow chart 1200 of a method of wireless communication. The method may be performed by a UE. At step 1202, the UE receives at a service layer a SIB15 indicating at least one SAI corresponding to at least one frequency. At step 1204, the UE detects at the service layer a USD indicating at least one eMBMS service corresponding to at least one SAI and at least one frequency. As discussed supra, the UE may be provided with a combination of the USD and the SIB 15 indicating one or more SAI/frequency pairs. Referring to FIG. 8, the USD may include one or more TMGIs. Thus, when a user chooses a particular service using the UE, the UE selects the TMGI such that a service corresponding to the TMGI is provided.

At step 1206, the UE correlates the USD with the SIB15 at the service layer and determines at least one available eMBMS service based on the correlation. For example, referring back to FIG. 8, the UE 820 receives SIB15 (F1, SAI1; F2: SAI2) from cell A, and determines based on the USD that TMGI1 and TMGI3 are available in SAI1 associated with the frequency F1. Finally, at step 1208, the UE determines at the service layer based on information received from a modem layer whether a current serving cell on which the UE is camped is capable of providing an available eMBMS service at a serving frequency. Step 1208 is expanded upon in FIGS. 13 and 14.

Figure 13:
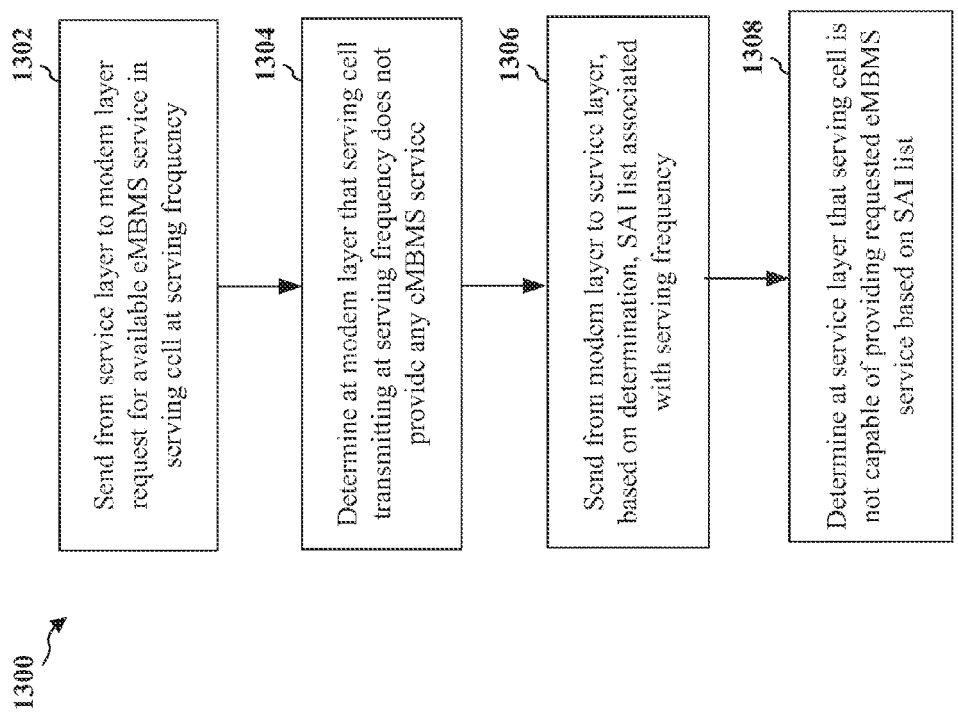
FIG. 13 is a flow chart of a method of wireless communication, according to one aspect.

FIG. 13 is a flow chart 1300 of a method of wireless communication that expands upon the flow chart 1200 of FIG. 12, according to one aspect. The method may be performed by a UE. At step 1302, the UE sends from the service layer to the modem layer a request for an eMBMS service indicated as available in the serving cell at the serving frequency. As discussed supra, UE 901 may select a particular service, which will trigger the SL to send the TMGI request corresponding to the selected service to the ML. At step 1304, the modem layer of the UE that the serving cell transmitting at the serving frequency does not provide any eMBMS service. For example, as discussed supra, if the UE 901 determines that the serving cell does not broadcasts SIB13, the UE 901 determines that the serving cell does not provide any eMBMS service.

At step 1306, the UE sends from the modem layer to the service layer, based on the determination, an SAI list associated with the serving frequency, the SAI list including an indication that each SAI in the SAI list is not provided by the serving cell. At step 1308, the UE determines at the service layer that the serving cell is not capable of providing the requested eMBMS service based on the SAI list. The UE may be configured to determine at the service layer that the serving cell is not capable of providing the requested eMBMS service based on the SAI list by determining that a TMGI corresponding to the selected service provided in an SAI in the SAI list is not provided by the serving cell. For example, as discussed supra, if the ML of the UE 901 determines that the serving cell does not provide any eMBMS service, the ML will report an intra-frequency SAI list to the SL of the UE 901 with a remark that the SAIs are not available in the serving cell of the UE 901. The SL determines based on the remark that TMGIs corresponding to the SAIs on the intra-frequency SAI list are not available in the serving cell, and subsequently determines that the serving cell does not provide any eMBMS service.

Figure 14:
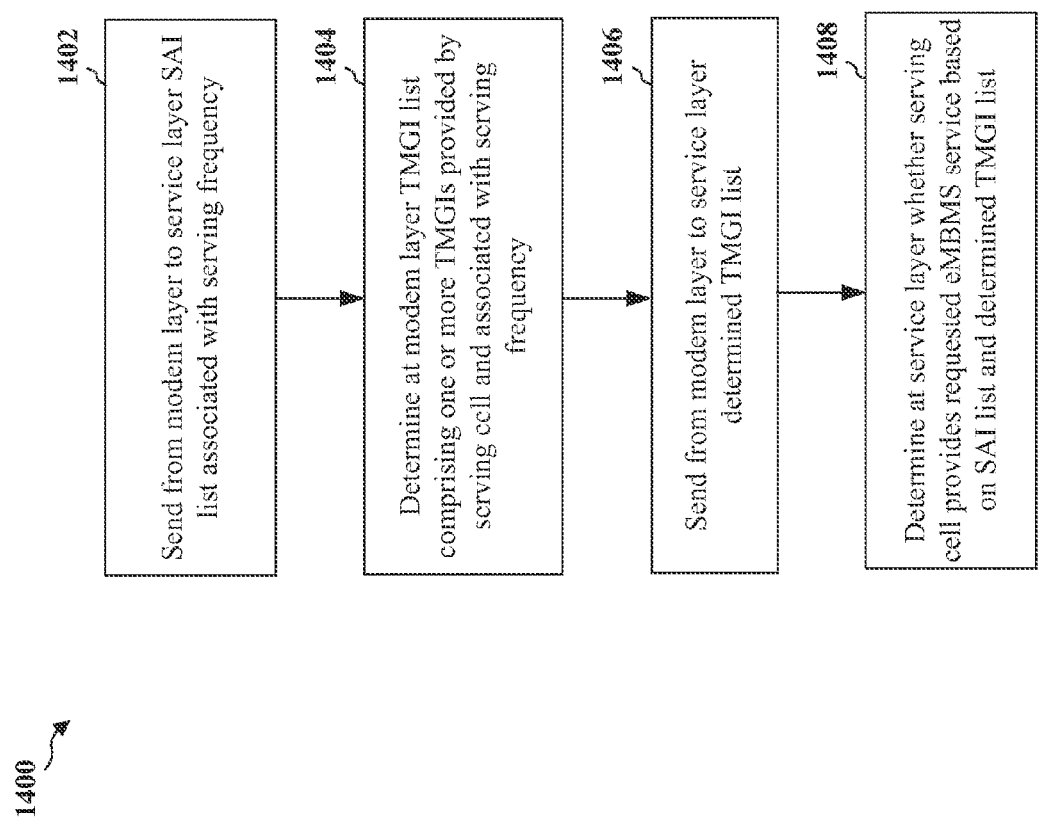
FIG. 14 is a flow chart of a method of wireless communication, according to one aspect.

FIG. 14 is a flow chart 1400 of a method of wireless communication that expands upon the flow chart 1200 of FIG. 12, according to another aspect. The method may be performed by the UE. At step 1402, the UE sends from the modem layer to the service layer an SAI list associated with the serving frequency. At step 1404, the UE determines at the modem layer a TMGI list including one or more TMGIs provided by the serving cell and associated with the serving frequency. At step 1406, the UE sends from the modem layer to the service layer the determined TMGI list. For example, as discussed supra, the ML of the UE 901 sends the intra-frequency SAI list to the SL of the UE 901, and a list of available TMGIs to the SL. The list of available TMGIs includes TMGIs that are available in a particular SAI on a particular frequency in the current serving cell of the UE 901. As discussed supra, to form the list of available TMGIs, the UE 901 may acquire SIB13 and MCCH to determine services that are offered by the current serving cell of the UE 901, and then determine available TMGIs that are offered by the current serving cell.

At step 1408, the UE determines at the service layer whether the serving cell provides a requested eMBMS service based on the SAI list and the determined TMGI list.

The service layer determines that a TMGI included in the TMGI list is available from the serving cell, and the service layer determines that a SAI included in the SAI list is available from the serving cell when the SAI corresponds to a TMGI included in the TMGI list. For example, as discussed supra, when the SL of the UE 901 receives the intra-frequency SAI list and the available TMGI list from the ML, the SL may cross-check between the intra-frequency SAI list and the available TMGI list to determine the available TMGIs offered by the serving cell. If a TMGI corresponding to a certain SAI associated with a serving frequency for the requested service is not found to be an available TMGI for the serving cell, the SL of the UE 901 determines that the serving cell does not provide the selected service. It is also noted that an activate service request is not sent from the service layer to the modem layer if the serving cell does not provide the requested eMBMS service.

Figure 15:
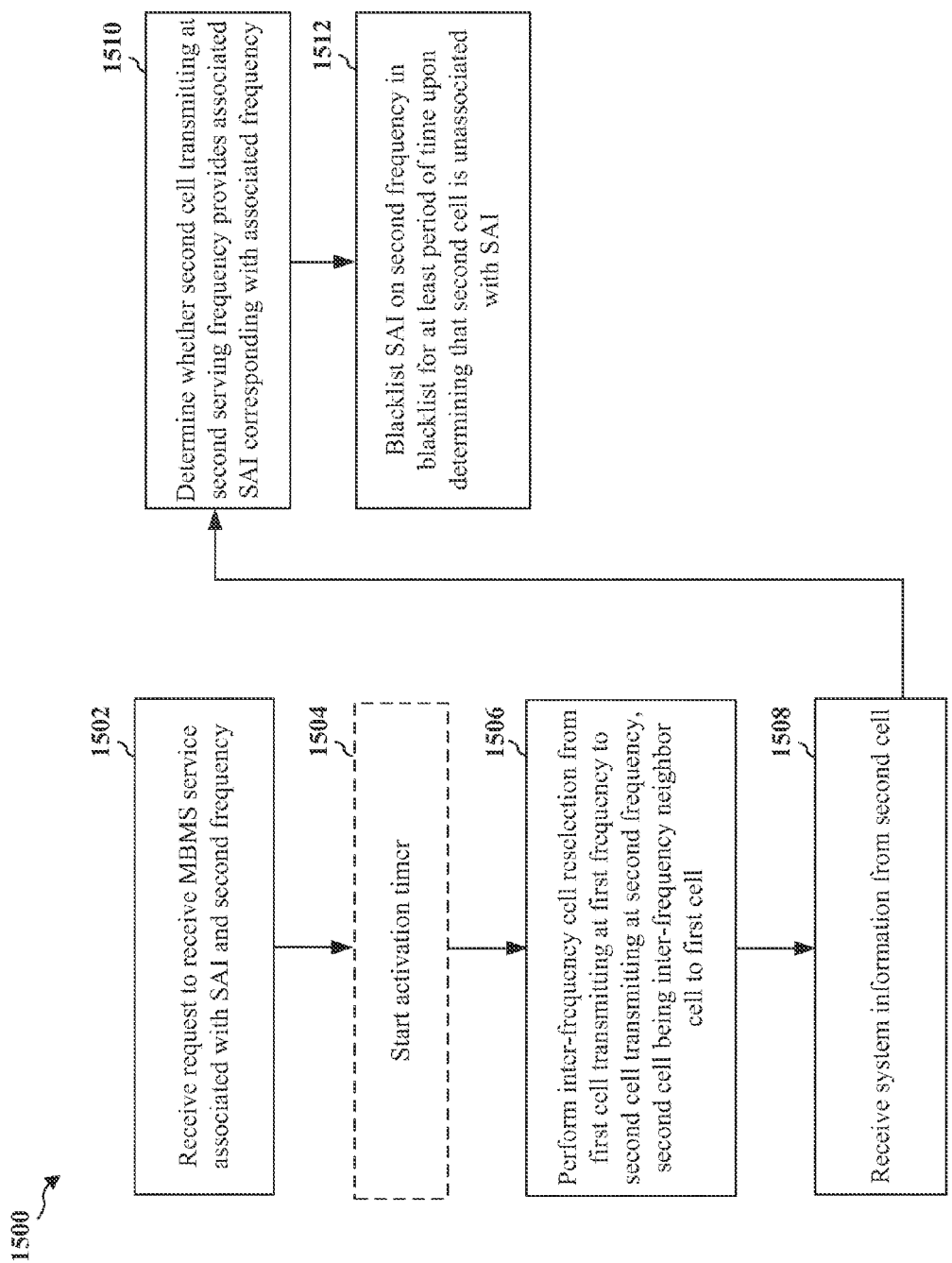
FIG. 15 is a flow chart of a method of wireless communication, according to one aspect.

FIG. 15 is a flow chart 1500 of a method of wireless communication. The method may be performed by the UE. At step 1502, the UE receives a request to receive a Multimedia Broadcast Multicast Service (MBMS) service associated with a service area identity (SAI) and a second frequency. For example, the ML of the UE receives the activate service request for an eMBMS service available in SAI1 on frequency F1. As discussed supra, each service is associated with a frequency for the service and an SAI that identifies a service area covered by one or more cells including the current cell offering the service. When the service is selected, the UE selects the corresponding TMGI that identifies the service offered in the SAI1 on frequency F1.

At step 1504, the UE may start an activation timer before performing inter-frequency cell reselection from the first cell to the second cell upon determining that the second frequency corresponding with the requested MBMS service is the same as the second frequency of the second cell. After the second cell is reselected, the SAI on the second frequency is not blacklisted if the SAI is included in an intra-frequency SAI list of the second frequency of the second cell. When the requested service is not provided in the second cell, upon expiration of the activation timer activation failure is reported. For example, referring to FIG. 10, the ML does not immediately place F2:SAI2 in the blacklist even when the ML cannot find the desired TMGI on the MCCH, but instead starts an activation timer ($T_{act}$) after the TMGI Activation Request is received. The ML will report an activation failure when $T_{act}$ expires and the TMGI does not show up on the MCCH. For example, referring to FIG. 10, because SAI2 on F2 is in the intra-frequency SAI list, the UE 1001 does not blacklist SAI2 on F2, at least until $T_{act}$ expires.

At step 1506, the UE performs inter-frequency cell reselection from a first cell transmitting at a first frequency to a second cell transmitting at the second frequency, the second cell being an inter-frequency neighbor cell to the first cell. For example, referring back to FIG. 11, if a service requested by a UE 1101 corresponds to a TMGI associated with F2:SAI2, the UE 1101 performs in step 1145 a cell reselection procedure to reselect Cell C 1120 from Cell A 1110, thereby changing the serving frequency for the UE 1101 from F1 of Cell A 1110 to F2 of Cell C 1120.

At step 1508, the UE receives system information from the second cell. At step 1510, the UE determines that the second cell transmitting at the second frequency is unassociated with the SAI based on the received system information. At step 1512, the UE blacklists the SAI on the second frequency in a blacklist for at least a period of time upon determining that the second cell is unassociated with the SAI The UE configured to determine that the second cell is unassociated with the SAI on the second frequency is further configured to determine that an intra-frequency SAI list of the second cell does not include the SAI on the second frequency. For example, referring back to FIG. 11, after the UE 1101 reselects to Cell C 1120 and receives the Cell C SIB15 1121 from Cell C 1120, the UE 1101 checks in step 1149 whether SAI2 is on the intra-frequency list for F2. If SAI2 is not on the intra-frequency list for F2, the UE 1101 places F2:SAI2 in a blacklist and starts a black list timer.

Figure 16:
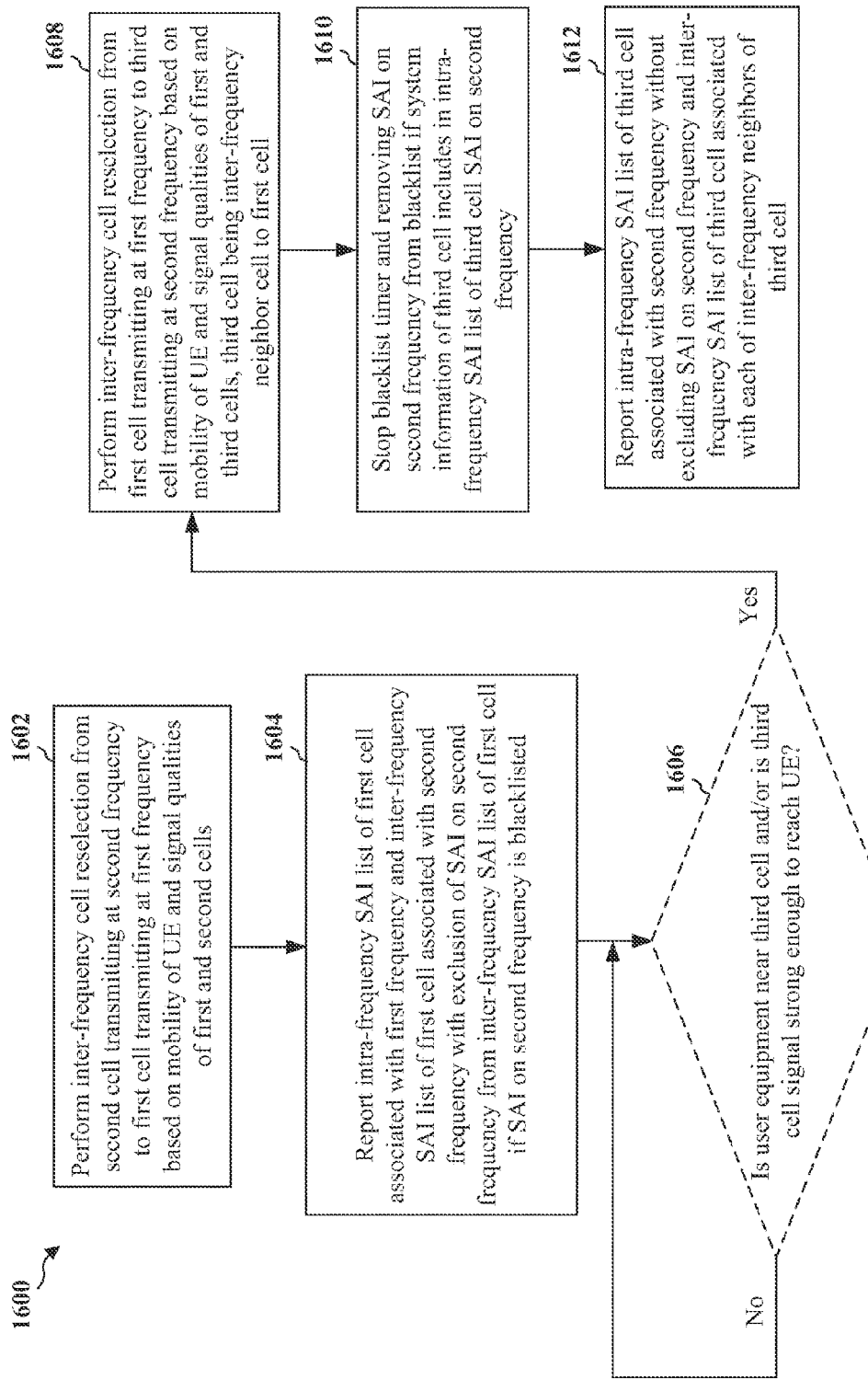
FIG. 16 is a flow chart of a method of wireless communication, according to one aspect.

FIG. 16 is a flow chart 1600 of a method of wireless communication that expands upon the flow chart 1500 of FIG. 15, according to one aspect. The method may be performed by the UE. At step 1602, the UE performs inter-frequency cell reselection from the second cell transmitting at the second frequency to the first cell transmitting at the first frequency based on a mobility of a user equipment (UE) and signal qualities of the first and second cells. For example, referring to FIG. 11, if the UE 1101 cannot receive a service corresponding to a TMGI associated with F2:SAI2 in Cell C 1120 after reselecting to Cell C 1120, then the UE performs another reselection procedure in step 1151 to reselect to Cell A 1110 from Cell C 1120.

At step 1604, the UE may report an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted. That is, after the cell-reselection to the first cell, if the associated SAI corresponding with the associated frequency is included in the black list, the ML of the UE may report to the SL the inter-frequency SAI list of the first cell that does not include the associated SAI corresponding with the associated frequency. For example, referring to FIG. 11, if F2:SAI2 is in the blacklist, the modem layer of the UE 1101 reports in step 1155 an inter-frequency SAI list that excludes F2:SAI2 to the SL of the UE 1101.

At step 1606, the UE determines that the UE is near a third cell and/or the third cell signal is strong enough to be received by the UE. For example, referring to FIG. 11, the UE 1101 in Cell A 1110 may move away from Cell C 1120 and toward Cell D 1130, such that the UE 1101 finds the signal strength of Cell C 1120 to be weak and the signal strength of Cell D 1130 to be strong. At step 1608, the UE performs inter-frequency cell reselection from the first cell transmitting at the first frequency to a third cell transmitting at the second frequency based on a mobility of the UE and signal qualities of the first and the third cells, the third cell being an inter-frequency neighbor cell to the first cell. For example, referring to FIG. 11, if the UE determines that the signal strength of Cell C 1120 to be weak and the signal strength of Cell D 1130 to be strong, then the UE 1101 performs a reselection procedure to reselect to Cell D 1130 from Cell A 1110, thereby changing the serving frequency for the UE 1101 from F1 to F2, according to step 1157.

At step 1610, the UE stops a blacklist timer and removing the SAI on the second frequency from the blacklist if system information of the third cell includes in an intra-frequency SAI list of the third cell the SAI on the second frequency. At step 1612, the UE reports the intra-frequency SAI list of the third cell associated with the second frequency without excluding the SAI on the second frequency and an inter-frequency SAI list of the third cell associated with each of the inter-frequency neighbors of the third cell. For example, referring to FIG. 11, if SAI2 is on the intra-frequency SAI list for F2 because Cell D 1130 supports a service corresponding F2:SAI2 and if the blacklist timing is still running, the UE 1101 stops the blacklist timer in step 1161. Then, referring to FIG. 11, in step 1163, the UE 1101 reports the intra-frequency SAI list including SAI2 for F2 to the SL, and then the SL can find a service corresponding to a TMGI associated with F2:SAI2.

Figure 17:
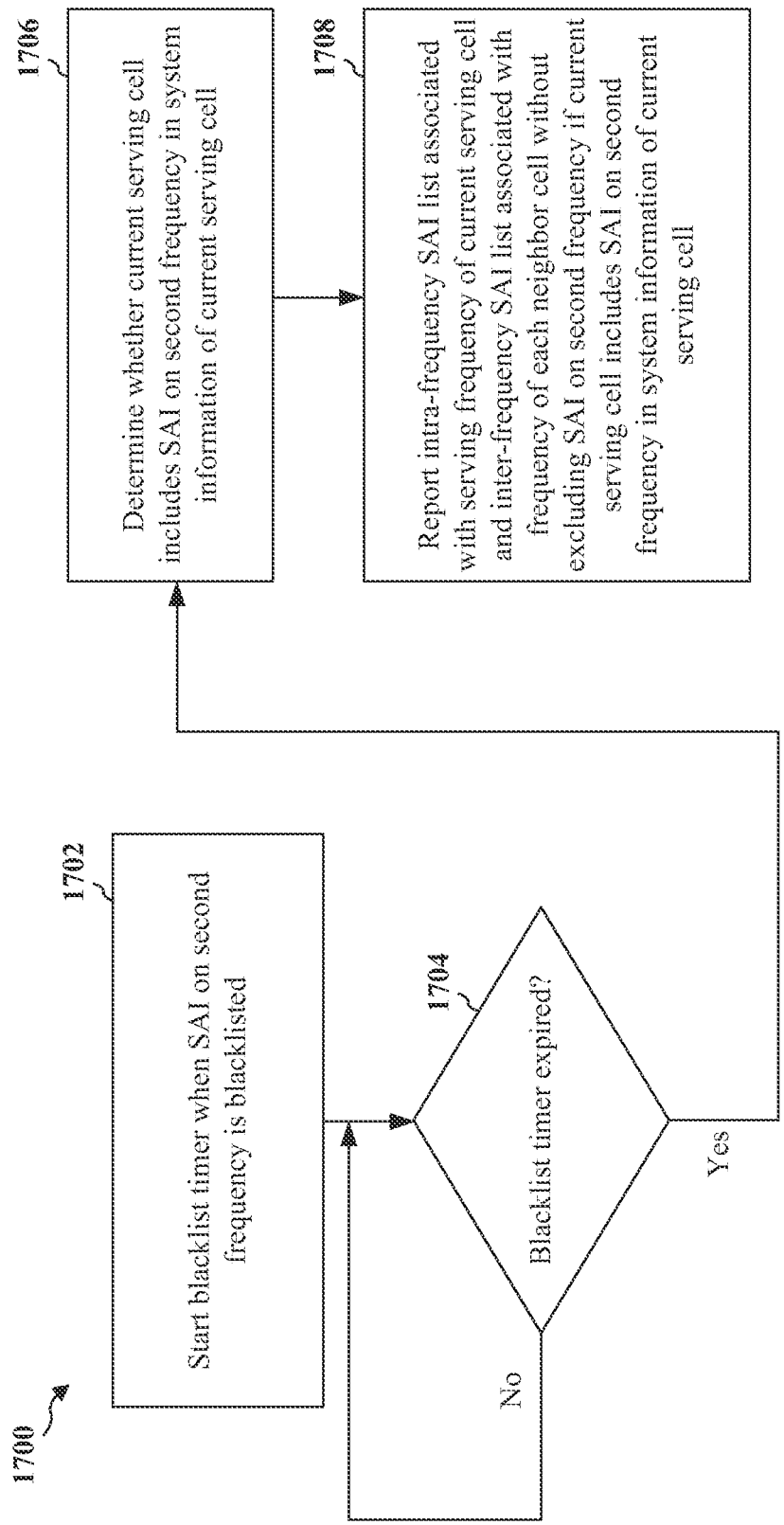
FIG. 17 is a flow chart of a method of wireless communication, according to one aspect.

FIG. 17 is a flow chart 1700 of a method of wireless communication that expands upon the flow chart 1500 of FIG. 15, according to another aspect. The method may be performed by the UE. As discussed supra, at step 1516 of FIG. 15, the UE includes the associated SAI corresponding with the associated frequency in a blacklist if the SIB15 of the second cell does not include the associated SAI corresponding with the associated frequency. Step 1702 may take place if the UE at step 1516 includes the associated SAI corresponding with the associated frequency in a black list. At step 1702, the UE starts a blacklist timer when the SAI on the second frequency is blacklisted. At step 1704, the UE determines whether the blacklist timer has expired. At step 1706, if the blacklist timer expires, the UE determines whether a current serving cell includes the SAI on the second frequency in system information of the current serving cell. At step 1708, the UE reports an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell. A duration of the blacklist timer is configured according to a mobility of a UE and the mobility of the UE is determined based on a travel history of the UE. For example, as discussed supra, when the blacklist timer expires, UE 901 checks to ensure that SAI2 associated with F2 is in the SIB15 of the cell on which the UE 901 is currently camped, then the UE will report the updated inter-frequency SAI list without excluding SAI2 associated with F2 if SAI2 is available on F2 according to the currently camped cell's SIB15.

Figure 18:
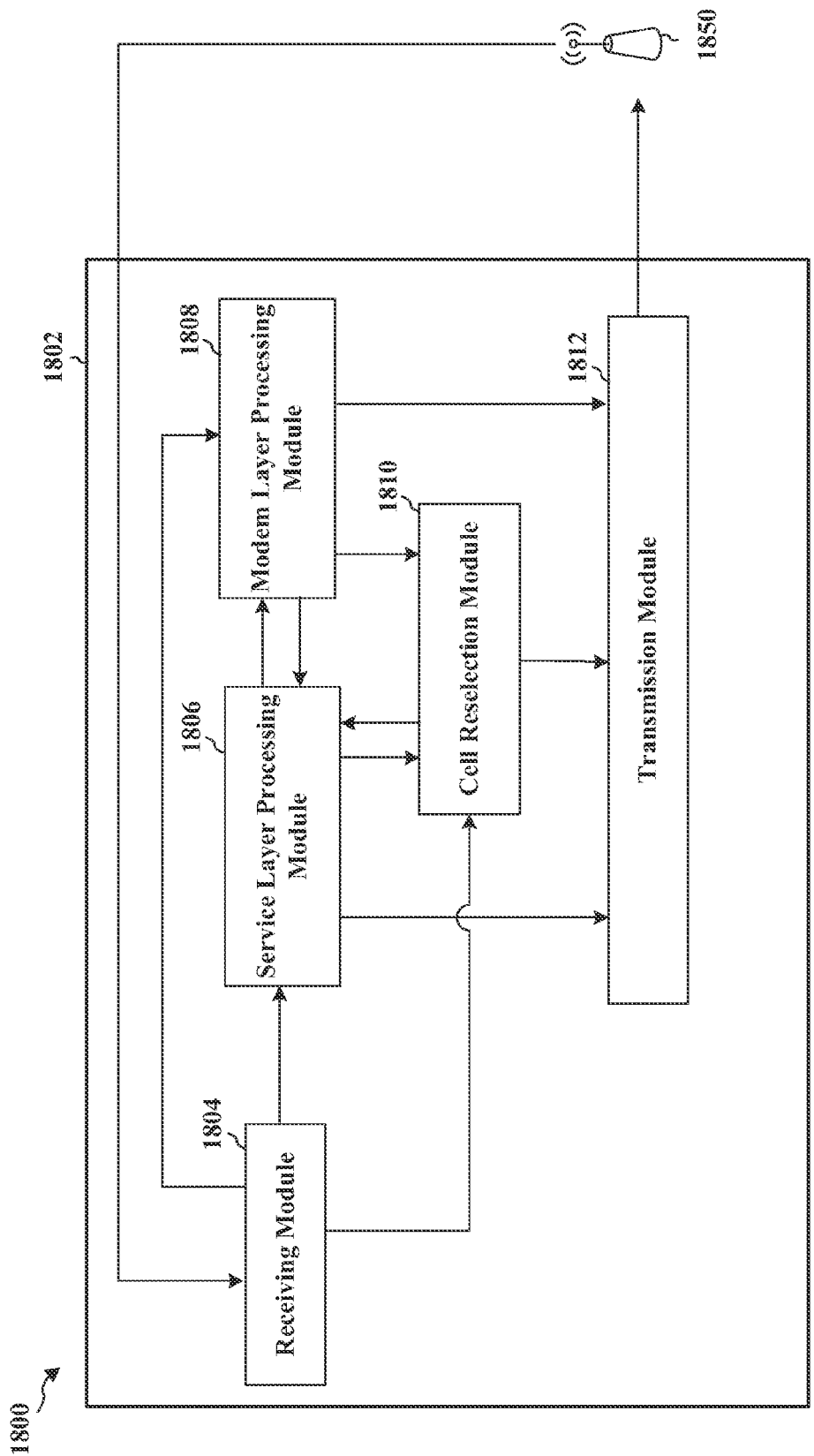
FIG. 18 is a conceptual data flow diagram illustrating the data flow between different modules/means/components in an exemplary apparatus.

FIG. 18 is a conceptual data flow diagram 1800 illustrating the data flow between different modules/means/components in an exemplary apparatus 1802. The apparatus may be a UE. The apparatus includes a receiving module 1804, a service layer processing module 1806, a modem layer processing module 1808, a cell reselection module 1810, and a transmission module 1812. The transmission module 1812 may communicate with the cell reselection module 1810 to perform a cell reselection procedure. 1806

In one aspect, the service layer processing module 1806 receives (via the receiving module 1804) a SIB15 indicating at least one SAI corresponding to at least one frequency. The service layer processing module 1806 detects a USD indicating at least one eMBMS service corresponding to at least one SAI and at least one frequency. The service layer processing module 1806 correlates the USD with the SIB15 and determine at least one available eMBMS service based on the correlation. The service layer processing module 1806 determines based on information received from the modem layer processing module 1808 whether a serving cell is capable of providing an available eMBMS service at a serving frequency.

The service layer processing module 1806 sends to the modem layer processing module 1808 a request for an available eMBMS service in the serving cell at the serving frequency. The modem layer processing module 1808 determines that the serving cell transmitting at the serving frequency does not provide any eMBMS service. The modem layer processing module 1808 sends to the service layer processing module 1806, based on the determination, an SAI list associated with the serving frequency, the SAI list including an indication that each SAI in the SAI list is not provided by the serving cell. The service layer processing module 1806 determines that the serving cell is not capable of providing the requested eMBMS service based on the SAI list.

The modem layer processing module 1808 sends to the service layer processing module 1806 an SAI list associated with the serving frequency. The modem layer processing module 1808 determines a TMGI list including one or more TMGIs provided by the serving cell and associated with the serving frequency. The modem layer processing module 1808 sends to the service layer processing module 1806 the determined TMGI list. The service layer processing module 1806 determines whether the serving cell provides a requested eMBMS service based on the SAI list and the determined TMGI list.

In another aspect, the modem layer processing module 1808 receives from the service layer processing module 1806 a request for an MBMS service associated with an SAI and a second frequency. The modem layer processing module 1808 starts an activation timer before performing the inter-frequency cell reselection from the first cell to the second cell upon determining that the second frequency corresponding with the requested MBMS service is the same as the second frequency of the second cell. After the second cell is reselected, the SAI on the second frequency is not blacklisted if the SAI is included in an intra-frequency SAI list of the second frequency of the second cell. When the activation timer expires and the requested MBMS service is not provided in the second cell, the modem layer processing module 1808 reports service activation failure to the service layer processing module 1806. The cell reselection module 1810 inter-frequency cell reselection from a first cell transmitting at a first frequency to a second cell transmitting at the second frequency, the second cell being an inter-frequency neighbor cell to the first cell. The receiving module 1804 receives system information from the second cell. The modem layer processing module 1808 determines that the second cell transmitting at the second frequency is unassociated with the SAI based on the received system information, where the SAI and the second frequency correspond with the MBMS service requested by the request. The modem layer processing module 1808 blacklisting the SAI on the second frequency in a blacklist for at least a period of time upon determining that the second cell is unassociated with the SAI.

The cell reselection module 1810 performs inter-frequency cell reselection from the second cell transmitting at the second frequency to the first cell transmitting at the first frequency based on a mobility of a UE (e.g., apparatus 1802) and signal qualities of the first and second cells. The modem layer processing module 1808 reports to the service layer processing module 1806 an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted.

The cell reselection module 1810 performs inter-frequency cell reselection from the first cell transmitting at the first frequency to a third cell transmitting at the second frequency based on a mobility of the UE and signal qualities of the first and the third cells, the third cell being an inter-frequency neighbor cell to the first cell. The modem layer processing module 1808 stops a blacklist timer and removing the SAI on the second frequency from the blacklist if system information of the third cell includes in an intra-frequency SAI list of the third cell the SAI on the second frequency. The modem layer processing module 1808 reports to the service layer processing module 1806 the intra-frequency SAI list of the third cell associated with the second frequency without excluding the SAI on the second frequency and an inter-frequency SAI list of the third cell associated with each of the inter-frequency neighbors of the third cell.

The modem layer processing module 1808 starts a blacklist timer when the SAI on the second frequency is blacklisted. The modem layer processing module 1808 may start the blacklist timer if modem layer processing module 1808 blacklists the SAI corresponding with the second frequency in the black list after determining that the system information of the second cell does not include the SAI corresponding with the second frequency. If the blacklist timer expires, the modem layer processing module 1808 whether a current serving cell includes the SAI on the second frequency in system information of the current serving cell, and reports to the service layer processing module 1806 an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell.

The apparatus may include additional modules that perform each of the steps of the algorithm in the aforementioned flow charts of FIGS. 12-17. As such, each step in the aforementioned flow charts of FIGS. 12-17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
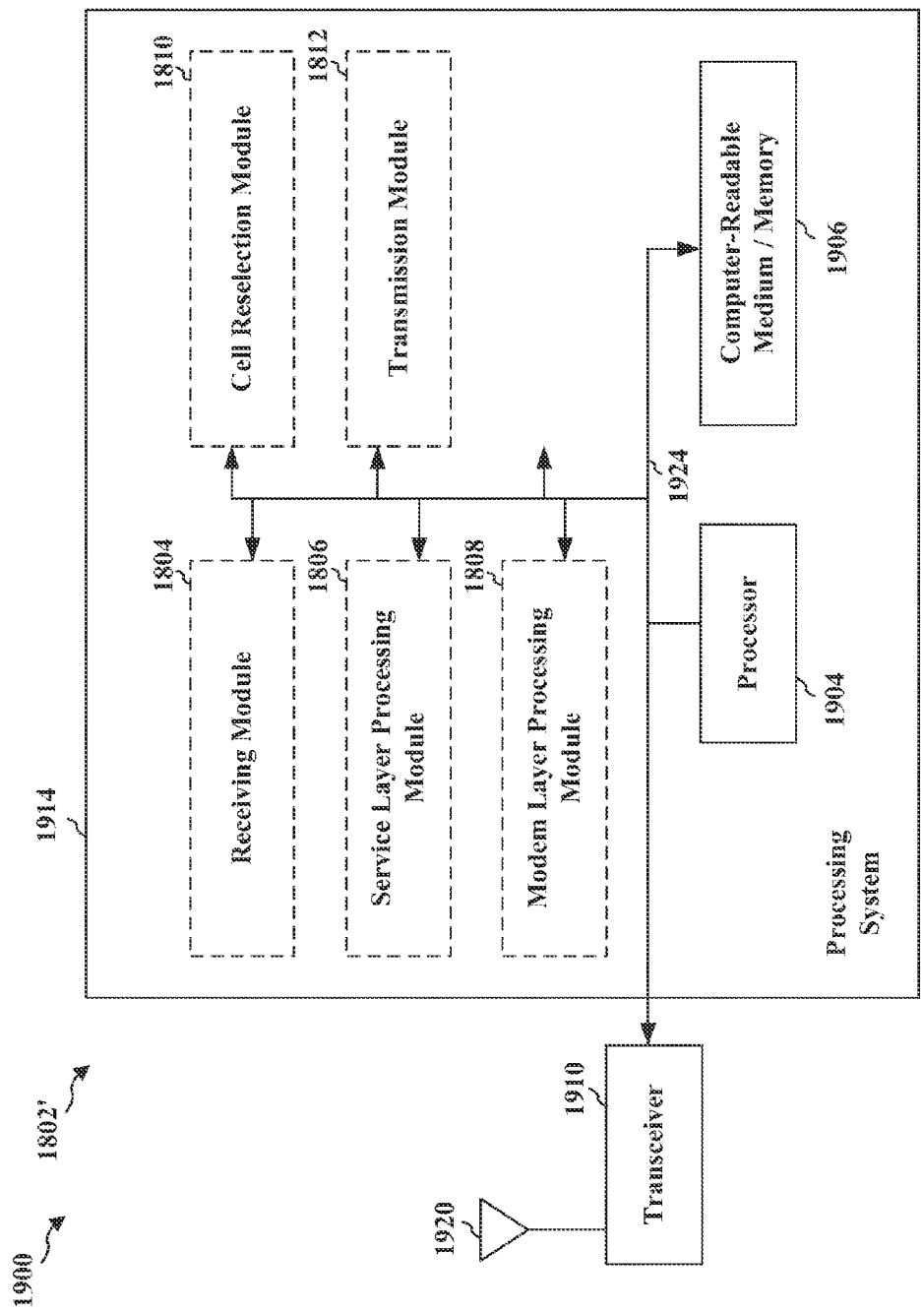
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, 1810, 1812, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the receiving module 1804. In addition, the transceiver 1910 receives information from the processing system 1914, specifically the transmission module 1812, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system further includes at least one of the modules 1804, 1806, 1808, 1810, and 1812. The modules may be software modules running in the processor 1904, resident/stored in the computer readable medium/memory 1906, one or more hardware modules coupled to the processor 1904, or some combination thereof. The processing system 1914 may be a component of the UE 650 and may include the memory 660 and/or at least one of the TX processor 668, the RX processor 656, and the controller/processor 659.

In one configuration, the apparatus 1802/1802' for wireless communication includes means for receiving at a service layer a SIB15 indicating at least one SAI corresponding to at least one frequency, means for detecting at the service layer a USD indicating at least one eMBMS service corresponding to at least one SAI and at least one frequency, means for correlating the USD with the SIB15 at the service layer and determining at least one available eMBMS service based on the correlation, and means for determining at the service layer based on information received from a modem layer whether a current serving cell on which the UE is camped is capable of providing an available eMBMS service at a serving frequency. The apparatus 1802/1802' for wireless communication includes means for sending from the service layer to the modem layer a request for an available eMBMS service in the serving cell at the serving frequency, means for determining at the modem layer that the serving cell transmitting at the serving frequency does not provide any eMBMS service, means for sending from the modem layer to the service layer, based on the determination, an SAI list associated with the serving frequency, the SAI list including an indication that each SAI in the SAI list is not provided by the serving cell, and means for determining at the service layer that the serving cell is not capable of providing the requested eMBMS service based on the SAI list. The apparatus 1802/1802' for wireless communication includes means for sending from the modem layer to the service layer an SAI list associated with the serving frequency, means for determining at the modem layer a TMGI list including one or more TMGIs provided by the serving cell and associated with the serving frequency, means for sending from the modem layer to the service layer the determined TMGI list, and means for determining at the service layer whether the serving cell provides a requested eMBMS service based on the SAI list and the determined TMGI list.

The apparatus 1802/1802' for wireless communication includes means receiving a request to receive an MBMS service associated with an SAI and a second frequency, means for performing inter-frequency cell reselection from a first cell transmitting at a first frequency to a second cell transmitting at the second frequency, the second cell being an inter-frequency neighbor cell to the first cell, means for receiving system information from the second cell, means for determining that the second cell transmitting at the second frequency is unassociated with the SAI based on the received system information, and means for blacklisting the SAI on the second frequency in a blacklist for at least a period of time upon determining that the second cell is unassociated with the SAI. The apparatus 1802/1802' for wireless communication includes means for starting an activation timer before performing the inter-frequency cell reselection from the first cell to the second cell upon determining that the second frequency corresponding with the requested MBMS service is the same as the second frequency of the second cell, where after the second cell is reselected, the SAI on the second frequency is not blacklisted if the SAI is included in an intra-frequency SAI list of the second frequency of the second cell, and where when the activation timer expires and the requested MBMS service is not provided in the second cell, activation failure is reported.

The apparatus 1802/1802' for wireless communication includes means for performing inter-frequency cell reselection from the second cell transmitting at the second frequency to the first cell transmitting at the first frequency based on a mobility of a UE and signal qualities of the first and second cells, means for reporting an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted, means for performing inter-frequency cell reselection from the first cell transmitting at the first frequency to a third cell transmitting at the second frequency based on a mobility of the UE and signal qualities of the first and the third cells, the third cell being an inter-frequency neighbor cell to the first cell, means for stopping a blacklist timer and removing the SAI on the second frequency from the blacklist if system information of the third cell includes in an intra-frequency SAI list of the third cell the SAI on the second frequency, and means for reporting the intra-frequency SAI list of the third cell associated with the second frequency without excluding the SAI on the second frequency and an inter-frequency SAI list of the third cell associated with each of the inter-frequency neighbors of the third cell.

The apparatus 1802/1802' for wireless communication includes means for starting a blacklist timer when the SAI on the second frequency is blacklisted, means for determining whether a current serving cell includes the SAI on the second frequency in system information of the current serving cell, and for reporting an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell.

The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving a request to receive a Multimedia Broadcast Multicast Service (MBMS) service associated with a service area identity (SAI) and a second frequency;
   performing inter-frequency cell reselection from a first cell transmitting at a first frequency to a second cell transmitting at the second frequency, the second cell being an inter-frequency neighbor cell to the first cell;
   receiving system information from the second cell;
   determining that the second cell transmitting at the second frequency is unassociated with the SAI based on the received system information; and
   blacklisting the SAI on the second frequency in a blacklist for at least a period of time upon determining that the second cell is unassociated with the SAI.

2. The method of claim 1, further comprising:
   performing inter-frequency cell reselection from the second cell transmitting at the second frequency to the first cell transmitting at the first frequency based on a mobility of a user equipment (UE) and signal qualities of the first and second cells; and
   reporting an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted.

3. The method of claim 2, further comprising:
performing inter-frequency cell reselection from the first cell transmitting at the first frequency to a third cell transmitting at the second frequency based on a mobility of the UE and signal qualities of the first and the third cells, the third cell being an inter-frequency neighbor cell to the first cell;
stopping a blacklist timer and removing the SAI on the second frequency from the blacklist if system information of the third cell includes in an intra-frequency SAI list of the third cell the SAI on the second frequency; and
reporting the intra-frequency SAI list of the third cell associated with the second frequency without excluding the SAI on the second frequency and an inter-frequency SAI list of the third cell associated with each of the inter-frequency neighbors of the third cell.

4. The method of claim 1, further comprising:
starting a blacklist timer when the SAI on the second frequency is blacklisted,
wherein when the blacklist timer expires, the method further comprises:
determining whether a current serving cell includes the SAI on the second frequency in system information of the current serving cell; and
reporting an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell.

5. The method of claim 4, wherein a duration of the blacklist timer is configured according to a mobility of a user equipment (UE) and the mobility of the UE is determined based on a travel history of the UE.

6. The method of claim 1, wherein the determining that the second cell is unassociated with the SAI on the second frequency comprises:
determining that an intra-frequency SAI list of the second cell does not include the SAI on the second frequency.

7. The method of claim 1, further comprising:
starting an activation timer before performing the inter-frequency cell reselection from the first cell to the second cell upon determining that the second frequency corresponding with the requested MBMS service is the same as the second frequency of the second cell,
wherein after the second cell is reselected, the SAI on the second frequency is not blacklisted if the SAI is included in an intra-frequency SAI list of the second frequency of the second cell, and
wherein when the activation timer expires and the requested MBMS service is not provided in the second cell, activation failure is reported.

8. An apparatus of wireless communication, the apparatus being a user equipment (UE) and comprising:
means for receiving a request to receive a Multimedia Broadcast Multicast Service (MBMS) service associated with a service area identity (SAI) and a second frequency;
means for performing inter-frequency cell reselection from a first cell transmitting at a first frequency to a second cell transmitting at the second frequency, the second cell being an inter-frequency neighbor cell to the first cell;
means for receiving system information from the second cell;
means for determining that the second cell transmitting at the second frequency is unassociated with the SAI based on the received system information; and
means for blacklisting the SAI on the second frequency in a blacklist for at least a period of time upon determining that the second cell is unassociated with the SAI.

9. The apparatus of claim 8, further comprising:
means for performing inter-frequency cell reselection from the second cell transmitting at the second frequency to the first cell transmitting at the first frequency based on a mobility of a user equipment (UE) and signal qualities of the first and second cells; and
means for reporting an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted.

10. The apparatus of claim 9, further comprising:
means for performing inter-frequency cell reselection from the first cell transmitting at the first frequency to a third cell transmitting at the second frequency based on a mobility of the UE and signal qualities of the first and the third cells, the third cell being an inter-frequency neighbor cell to the first cell;
means for stopping a blacklist timer and removing the SAI on the second frequency from the blacklist if system information of the third cell includes in an intra-frequency SAI list of the third cell the SAI on the second frequency; and
means for reporting the intra-frequency SAI list of the third cell associated with the second frequency without excluding the SAI on the second frequency and an inter-frequency SAI list of the third cell associated with each of the inter-frequency neighbors of the third cell.

11. The apparatus of claim 8, further comprising:
means for starting a blacklist timer when the SAI on the second frequency is blacklisted,
wherein when the blacklist timer expires, the apparatus further comprises:
means for determining whether a current serving cell includes the SAI on the second frequency in system information of the current serving cell; and
means for reporting an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell.

12. The apparatus of claim 11, wherein a duration of the blacklist timer is configured according to a mobility of a user equipment (UE) and the mobility of the UE is determined based on a travel history of the UE.

13. The apparatus of claim 8, wherein the means for the determining that the second cell is unassociated with the SAI on the second frequency is further configured to:
determine that an intra-frequency SAI list of the second cell does not include the SAI on the second frequency.

14. The apparatus of claim 8, further comprising:
means for starting an activation timer before performing the inter-frequency cell reselection from the first cell to the second cell upon determining that the second frequency corresponding with the requested MBMS service is the same as the second frequency of the second cell,
wherein after the second cell is reselected, the SAI on the second frequency is not blacklisted if the SAI is included in an intra-frequency SAI list of the second frequency of the second cell, and
wherein when the activation timer expires and the requested MBMS service is not provided in the second cell, activation failure is reported.

15. An apparatus of wireless communication, the apparatus being a user equipment (UE) and comprising:
a memory; and
at least one processor coupled to the memory and configured to:
receive a request to receive a Multimedia Broadcast Multicast Service (MBMS) service associated with a service area identity (SAI) and a second frequency;
perform inter-frequency cell reselection from a first cell transmitting at a first frequency to a second cell transmitting at the second frequency, the second cell being an inter-frequency neighbor cell to the first cell;
receive system information from the second cell;
determine that the second cell transmitting at the second frequency is unassociated with the SAI based on the received system information; and
blacklist the SAI on the second frequency in a blacklist for at least a period of time upon determining that the second cell is unassociated with the SAI.

16. The apparatus of claim 15, wherein the at least one processor is further configured to:
perform inter-frequency cell reselection from the second cell transmitting at the second frequency to the first cell transmitting at the first frequency based on a mobility of a user equipment (UE) and signal qualities of the first and second cells; and
report an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted.

17. The apparatus of claim 16, wherein the at least one processor is further configured to:
perform inter-frequency cell reselection from the first cell transmitting at the first frequency to a third cell transmitting at the second frequency based on a mobility of the UE and signal qualities of the first and the third cells, the third cell being an inter-frequency neighbor cell to the first cell;
stop a blacklist timer and removing the SAI on the second frequency from the blacklist if system information of the third cell includes in an intra-frequency SAI list of the third cell the SAI on the second frequency; and
report the intra-frequency SAI list of the third cell associated with the second frequency without excluding the SAI on the second frequency and an inter-frequency SAI list of the third cell associated with each of the inter-frequency neighbors of the third cell.

18. The apparatus of claim 15, wherein the at least one processor is further configured to:
start a blacklist timer when the SAI on the second frequency is blacklisted,
wherein when the blacklist timer expires, the at least one processor is further configured to:
determine whether a current serving cell includes the SAI on the second frequency in system information of the current serving cell; and
report an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell.

19. The apparatus of claim 18, wherein a duration of the blacklist timer is configured according to a mobility of a user equipment (UE) and the mobility of the UE is determined based on a travel history of the UE.

20. The apparatus of claim 15, wherein the at least one processor configured to determine that the second cell is unassociated with the SAI on the second frequency is further configured to:
determine that intra-frequency SAI list of the second cell does not include the SAI on the second frequency.

21. The apparatus of claim 15, wherein the at least one processor is further configured to:
start an activation timer before performing the inter-frequency cell reselection from the first cell to the second cell upon determining that the second frequency corresponding with the requested MBMS service is the same as the second frequency of the second cell,
wherein after the second cell is reselected, the SAI on the second frequency is not blacklisted if the SAI is included in an intra-frequency SAI list of the second frequency of the second cell, and
wherein when the activation timer expires and the requested MBMS service is not provided in the second cell, activation failure is reported.

22. A non-transitory computer-readable medium storing computer executable code for a user equipment (UE), comprising code to:
receive a request to receive a Multimedia Broadcast Multicast Service (MBMS) service associated with a service area identity (SAI) and a second frequency;
perform inter-frequency cell reselection from a first cell transmitting at a first frequency to a second cell transmitting at the second frequency, the second cell being an inter-frequency neighbor cell to the first cell;
receive system information from the second cell;
determine that the second cell transmitting at the second frequency is unassociated with the SAI based on the received system information; and
blacklist the SAI on the second frequency in a blacklist for at least a period of time upon determining that the second cell is unassociated with the SAI.

23. The non-transitory computer-readable medium of claim 22, further comprising code to:
perform inter-frequency cell reselection from the second cell transmitting at the second frequency to the first cell transmitting at the first frequency based on a mobility of a user equipment (UE) and signal qualities of the first and second cells; and
report an intra-frequency SAI list of the first cell associated with the first frequency and an inter-frequency SAI list of the first cell associated with the second frequency with exclusion of the SAI on the second frequency from the inter-frequency SAI list of the first cell if the SAI on the second frequency is blacklisted.

24. The non-transitory computer-readable medium of claim 23, further comprising code to:
perform inter-frequency cell reselection from the first cell transmitting at the first frequency to a third cell transmitting at the second frequency based on a mobility of the UE and signal qualities of the first and the third cells, the third cell being an inter-frequency neighbor cell to the first cell;
stop a blacklist timer and removing the SAI on the second frequency from the blacklist if system information of the third cell includes in an intra-frequency SAI list of the third cell the SAI on the second frequency; and
report the intra-frequency SAI list of the third cell associated with the second frequency without excluding the SAI on the second frequency and an inter-frequency SAI list of the third cell associated with each of the inter-frequency neighbors of the third cell.

25. The non-transitory computer-readable medium of claim 22, further comprising code to:
start a blacklist timer when the SAI on the second frequency is blacklisted,
wherein when the blacklist timer expires, the non-transitory computer-readable medium further comprises code to:
determine whether a current serving cell includes the SAI on the second frequency in system information of the current serving cell; and
report an intra-frequency SAI list associated with a serving frequency of the current serving cell and an inter-frequency SAI list associated with a frequency of each neighbor cell without excluding the SAI on the second frequency if the current serving cell includes the SAI on the second frequency in the system information of the current serving cell.

26. The non-transitory computer-readable medium of claim 22, wherein the code to determine that the second cell is unassociated with the SAI on the second frequency further comprises code to:
determine that intra-frequency SAI list of the second cell does not include the SAI on the second frequency.

27. The non-transitory computer-readable medium of claim 22, further comprising code to:
start an activation timer before performing the inter-frequency cell reselection from the first cell to the second cell upon determining that the second frequency corresponding with the requested MBMS service is the same as the second frequency of the second cell,
wherein after the second cell is reselected, the SAI on the second frequency is not blacklisted if the SAI is included in an intra-frequency SAI list of the second frequency of the second cell, and
wherein when the activation timer expires and the requested MBMS service is not provided in the second cell, activation failure is reported.

* * * * *